United States Patent
Atasoy et al.

(10) Patent No.: US 10,804,742 B2
(45) Date of Patent: Oct. 13, 2020

(54) VOLTAGE REGULATION IN WIRELESS POWER RECEIVERS

(71) Applicant: WiTricity Corporation, Watertown, MA (US)

(72) Inventors: Oguz Atasoy, Watertown, MA (US); Karl Twelker, Watertown, MA (US); Kylee Devro Sealy, Logan, UT (US)

(73) Assignee: WiTricity Corporation, Watertown, MA (US)

( * ) Notice: Subject to any disclaimer, the term of this patent is extended or adjusted under 35 U.S.C. 154(b) by 724 days.

(21) Appl. No.: 15/602,775

(22) Filed: May 23, 2017

(65) Prior Publication Data

US 2017/0346343 A1 Nov. 30, 2017

Related U.S. Application Data

(60) Provisional application No. 62/342,525, filed on May 27, 2016.

(51) Int. Cl.
  *H02J 50/12* (2016.01)
  *H01F 38/14* (2006.01)
  *H04B 5/00* (2006.01)
  *H04B 10/60* (2013.01)

(52) U.S. Cl.
  CPC .............. *H02J 50/12* (2016.02); *H01F 38/14* (2013.01); *H04B 5/0037* (2013.01); *H04B 10/60* (2013.01)

(58) Field of Classification Search
  None
  See application file for complete search history.

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2010/0141042 A1 | 6/2010 | Kesler et al. |

(Continued)

FOREIGN PATENT DOCUMENTS

| | | |
|---|---|---|
| CN | 103414255 A | 11/2013 |
| JP | 5635215 B1 | 12/2013 |
| WO | WO 2015/119511 A1 | 8/2015 |

OTHER PUBLICATIONS

The International Searching Authority, Notification of Transmittal of the International Search Report and the Written Opinion of the International Searching Authority, or the Declaration, PCT/US2017/033997, 13 pages, dated Sep. 12, 2017.

*Primary Examiner* — Jared Fureman
*Assistant Examiner* — Joel Barnett
(74) *Attorney, Agent, or Firm* — Goodwin Procter LLP

(57) ABSTRACT

A wireless power receiver includes one or more tunable capacitors in parallel with an inductor. The wireless power receiver adapted to receive an induced voltage input at the inductor due to a magnetic field generated by a wireless power transmitter. The rectifier has an output with a rectified voltage and a rectified current. A controller has a first input for receiving a signal representative of the rectified voltage and a first output for supplying an adjustment signal to the tunable capacitor. The controller includes a processor coupled to the first input and is configured to operate on the signal representative of rectified voltage to produce a desired capacitance value for capacitor and provide the adjustment signal determined so as to adjust a capacitance value of capacitor to the desired capacitance value.

19 Claims, 19 Drawing Sheets

(56) References Cited

U.S. PATENT DOCUMENTS

| | | |
|---|---|---|
| 2011/0193416 A1 | 8/2011 | Campanella et al. |
| 2014/0035704 A1 | 2/2014 | Efe et al. |
| 2014/0152117 A1 | 6/2014 | Sankar |
| 2014/0361636 A1 | 12/2014 | Endo et al. |
| 2015/0035372 A1* | 2/2015 | Aioanei ................. H02J 7/025 307/104 |
| 2015/0051750 A1 | 2/2015 | Kurs et al. |
| 2015/0244179 A1 | 8/2015 | Ritter et al. |
| 2016/0248275 A1 | 8/2016 | Okidan |
| 2016/0254679 A1* | 9/2016 | Liu ........................ H02J 7/025 307/104 |
| 2016/0308393 A1* | 10/2016 | Kumar ................... H02J 50/12 |
| 2017/0093168 A1* | 3/2017 | Von Novak, III ...... H02J 5/005 |
| 2017/0117751 A1 | 4/2017 | Karnstedt et al. |
| 2017/0324351 A1 | 11/2017 | Rochford |

\* cited by examiner

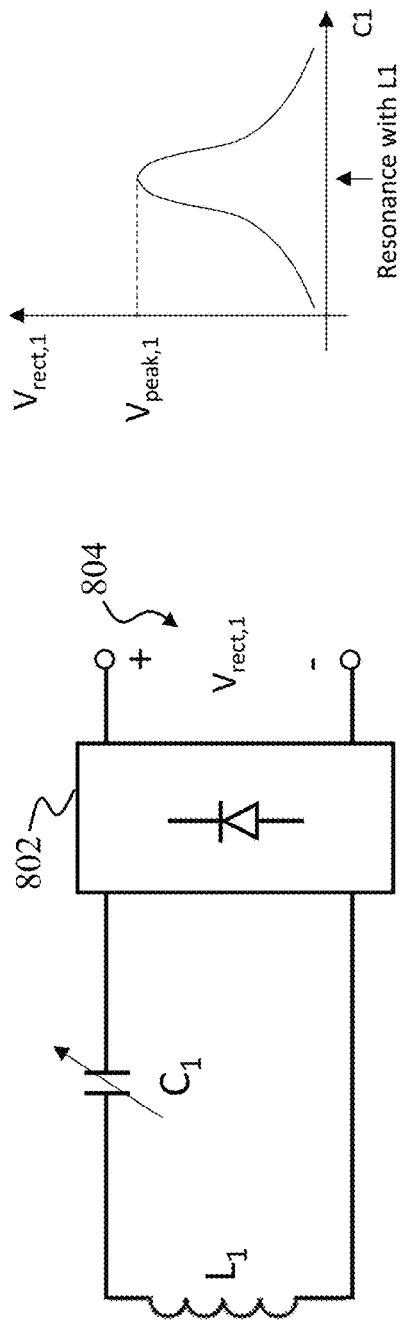
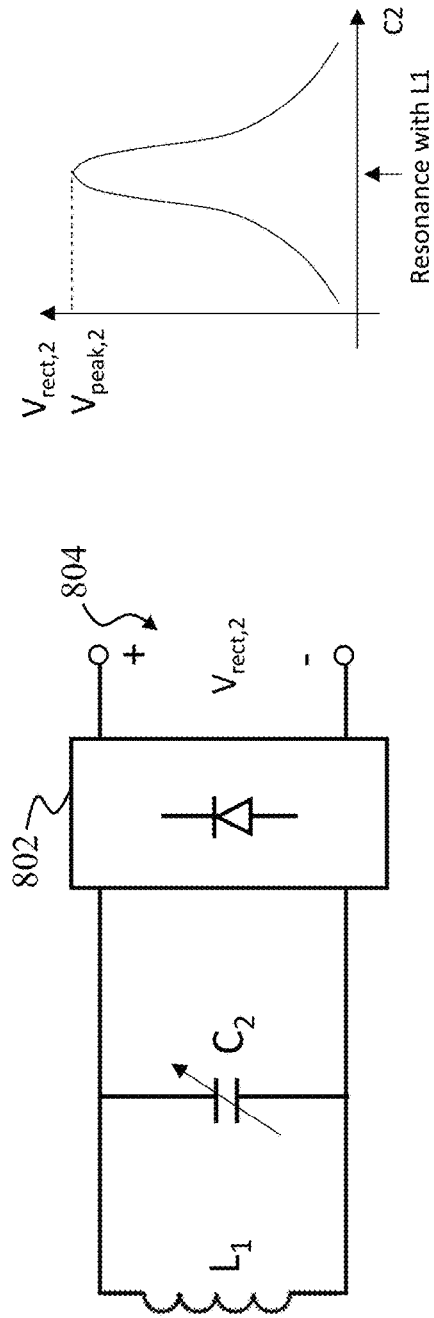
FIG. 8A  FIG. 8B
FIG. 8C  FIG. 8D

VOLTAGE REGULATION IN WIRELESS POWER RECEIVERS

CROSS-REFERENCE TO RELATED APPLICATIONS

This patent application claims priority to U.S. Provisional Patent Application No. 62/342,525, filed May 27, 2016, entitled, "VOLTAGE REGULATION IN WIRELESS POWER RECEIVERS", the disclosure of which is incorporated herein, in its entirety, by reference.

TECHNICAL FIELD

The disclosure generally relates to wireless power systems and, more particularly, the disclosure relates to voltage regulation in wireless power receivers in wireless power systems.

BACKGROUND

Wireless power receivers can receive power from wireless power transmitters via an oscillating magnetic field generated by the transmitter. Wireless power receivers can be coupled to electronic devices of varying power requirements. The power requirements of electronic devices, such as smartphones and laptops, can vary as the associated battery or batteries charge or discharge.

SUMMARY

In accordance with one embodiment, a wireless power receiver includes a circuit comprising a tunable capacitor $C_2$ in parallel with an inductor $L_1$, the wireless power receiver adapted to receive an induced voltage input $V_{induced}$ at the inductor $L_1$ due to a magnetic field generated by a wireless power transmitter, the wireless power receiver having an effective series resistance $R_{receiver}$. The receiver further includes a rectifier coupled to the circuit, the rectifier having an output with a rectified voltage $V_{rect}$ and a rectified current $I_{rect}$, and a controller having a first input for receiving a signal representative of the rectified voltage $V_{rect}$ and a first output for supplying an adjustment signal to the tunable capacitor $C_2$. The controller can include a processor coupled to the first input and be configured to (i) operate on the signal representative of rectified voltage $V_{rect}$ to produce a desired capacitance value $C_{2\_desired}$ for capacitor $C_2$ and (ii) provide the adjustment signal determined so as to adjust a capacitance value $C_{2\_value}$ of capacitor $C_2$ to the desired capacitance value $C_{2\_desired}$.

In a related embodiment, the processor is configured to compare the signal representative of rectified voltage $V_{rect}$ to a range of voltages defined by an upper limit $V_{upper}$ and a lower limit $V_{lower}$, the range of voltages stored in a memory of the controller; and the controller can be configured to transmit the adjustment signal to the tunable capacitor $C_2$ in response to the comparison of the value of rectified voltage $V_{rect}$ to the range of voltages.

In another related embodiment, the controller, to produce the desired capacitance value $C_{2\_desired}$, is configured to (iv) receive, at a second input of the controller, a signal representative of a rectified current $I_{rect}$ of the rectifier output, (v) operate, in the processor, on the signals representative of each of the rectified voltage $V_{rect}$ and current $I_{rect}$ to determine power $P_L$ to a load coupled to the rectifier output and resistance $R_L$ at the load, (vi) operate, in the processor, on the receiver resistance $R_{receiver}$ and power $P_L$ to determine power $P_{receiver}$ to the receiver, and (vii) operate, in the processor, on power $P_{receiver}$, a value of capacitor $C_2$, and a value of capacitor $C_3$ to determine an open circuit voltage value $V_{open}$, wherein the desired capacitance value $C_{2\_desired}$ is a function of $V_{open}$.

Optionally, a wireless power receiver further includes a tunable capacitor $C_3$ coupled in series with the circuit, wherein the controller includes a second output for supplying an adjustment signal to the tunable capacitor $C_3$. In some embodiments, the memory of the controller includes a lookup table that includes capacitance values $C_{3\_value}$ for given capacitance values $C_{2\_value}$ and load voltage values $V_{L\_value}$, for at least one load resistance value $R_{L\_value}$.

In a related embodiment, the controller selects the capacitance value $C_{3\_value}$ of the tunable capacitor $C_3$ such that the capacitance values $C_{2\_value}$ and $C_{3\_value}$ are resonant with the inductance $L_{1\_value}$ of inductor $L_1$, with a resonance frequency $f_{resonant}$. Optionally, the resonant frequency $f_{resonant}$ is approximately 6.78 MHz.

In a further related embodiment, capacitor $C_3$ includes two or more capacitors coupled in parallel or in series. Optionally, capacitor $C_3$ includes a switched capacitor, pulse width modulation (PWM) controlled capacitor, varactor, or barium strontium titanate (BST) capacitor. Optionally, a wireless power receiver includes a means for adjusting a capacitance value $C_{3\_value}$ of capacitor $C_3$. In some embodiments, a wireless power receiver includes a means for adjusting a capacitance value $C_{2\_value}$ of capacitor $C_2$.

In a related embodiment, a wireless power receiver further includes a tunable capacitor $C_3$ coupled in series with the circuit, wherein the controller, during the operation, (v) transmits, via a second output coupled to the processor, an adjustment signal to the tunable capacitor $C_3$ to adjust a capacitance value $C_{3\_value}$ the capacitor $C_3$ in response to the comparison of the value of rectified voltage $V_{rect}$ to of the range of voltages.

In a further related embodiment, capacitor $C_2$ comprises two or more capacitors coupled in parallel or in series. Optionally, a wireless power receiver further includes a tunable capacitor $C_1$ coupled in series with the inductor $L_1$, wherein the controller includes a third output for supplying an adjustment signal to the tunable capacitor $C_1$.

In accordance with another embodiment, a method is disclosed herein for regulating rectified voltage $V_{rect}$ in a system including a controller coupled to a wireless power receiver, the wireless power receiver including a rectifier coupled to a circuit, the circuit comprising a tunable capacitor $C_2$ in parallel with an inductor $L_1$, the wireless power receiver having an effective series resistance $R_{receiver}$, the rectifier having an output with a rectified voltage $V_{rect}$ and a rectified current $I_{rect}$. The method includes (i) receiving, at a first input of the controller, a signal representative of a rectified voltage $V_{rect}$, (ii) operating, in a processor coupled to the first input, on the signal representative of the rectified voltage $V_{rect}$ to produce a desired capacitance value $C_{2\_desired}$ for capacitor $C_2$, and (iii) providing, via a first output of the controller, an adjustment signal so as to adjust a capacitance value $C_{2\_value}$ of capacitor $C_2$ to the desired capacitance value $C_{2\_desired}$.

In a related embodiment, the method further includes (iv) comparing, by the processor, the signal representative of the rectified voltage $V_{rect}$ to a range of voltages defined by an upper limit $V_{upper}$ and lower limit $V_{lower}$, the range of voltages stored in a memory of the controller, and (v) transmitting, via the first output of the controller, the adjustment signal to the tunable capacitor $C_2$ in response to the comparison of the signal representative of the value of rectified voltage $V_{rect}$ to the range of voltages.

In an alternate embodiment, producing the desired capacitance value $C_{2\_desired}$ further includes (iv) receiving, at a second input of the controller, a signal representative of a rectified current $I_{rect}$, (v) operating, in the processor, on the signals representative of each of the rectified voltage $V_{rect}$ and current $I_{rect}$ to determine power $P_L$ to a load coupled to the rectifier output and resistance $R_L$ at the load, (vi) operating, in the processor, on the receiver resistance $R_{receiver}$ and power $P_L$ to determine power $P_{receiver}$ to the receiver, and (vii) operating, in the processor, on power $P_{receiver}$ to determine an open circuit voltage value $V_{open}$, wherein the desired capacitance value $C_{2\_desired}$ is a function of $V_{open}$.

In yet another related embodiment, the method further includes (viii) transmitting, via a second output coupled to the processor, an adjustment signal to a tunable capacitor $C_3$ coupled in series with the circuit. Optionally, the method further includes (ix) selecting, from a lookup table stored in a memory of the controller, a capacitance value $C_{3\_value}$ for given capacitance values $C_{2\_value}$ and load voltage values $V_L$ for at least one load resistance $R_L$. In some embodiment, the method further includes (x) adjusting, by the processor, the capacitance value $C_{3\_value}$ of the tunable capacitor $C_3$ such that the capacitance values $C_{2\_value}$ and $C_{3\_value}$ are resonant with the inductance $L_{1\_value}$ of inductor $L_1$, with a resonance frequency $f_{resonant}$.

BRIEF DESCRIPTION OF THE DRAWINGS

Those skilled in the art should more fully appreciate advantages of various embodiments from the following "Detailed Description," discussed with reference to the drawings summarized immediately below.

FIGS. 8A, 8C, 8E, and 8G show diagrams of exemplary embodiments of impedance matching networks for wireless power receivers. FIG. 8B shows a plot of rectified voltage as a function of capacitance $C_1$ values for the receiver shown in FIG. 8A. FIG. 8D shows a plot of rectified voltage as a function of capacitance $C_2$ values for the receiver shown in FIG. 8C.

DETAILED DESCRIPTION

Voltage induced across receiver resonator coils can be loaded by receiver circuitry. Typically, the receiver resonator is coupled to an impedance matching network (IMN), a rectifier (passive or active), filtering, and a regulating converter producing a desired parameter (e.g. DC-DC voltage regulator presenting a fix voltage supply to a load). Battery chargers are a special example where power is typically regulated. A local control loop (either feedforward or feedback) can be used. However, additional regulation stages, such as a DC-DC converter, can add power loss and complexity. In some embodiments, a preferred alternative may be regulation via the IMN (utilizing tunable elements) and/or active rectifiers.

Multiple tuning elements performing regulation of various parameters can remove the need for additional costly or bulky regulation circuitry which can ultimately lower efficiency of power transmission to the load or battery of an electronic device. Examples of electronic devices include cell phones, laptops, tablets, fitness devices, watches, and the like. Tuning elements can also decrease sensitivity to manufacturing tolerances, environmental effects (such as temperature), and other varying parameters. Care must be taken that controlling the tuning element does not cause more loss, greater EMI issues, etc. that counteract the benefit of tuning. Using multiple, high Q (quality factor) tuning elements, such as barium strontium titanate (BST) capacitors, can maintain high efficiency while performing regulation as well. Using high speed tuning elements like the PWM capacitor can have very fast transient response.

Key metrics of voltage or power regulation in the receiver circuitry include transient response, steady-state error, transmitter drive efficiency, power dissipation in receiver (thermals, product requirement, safety), non-linear distortion (electromagnetic interference (EMI)-radiated and conducted). Transient responses, which can be caused by load changes, changes in coupling, temperature drift, etc., necessitate some degree of compensation speed that may be implementation dependent. For example, the speed of control loops and communication between parts of the receiver and/or transmitter may limit the speed of response. Details of illustrative embodiments are discussed below.

System Description

Figure 1:
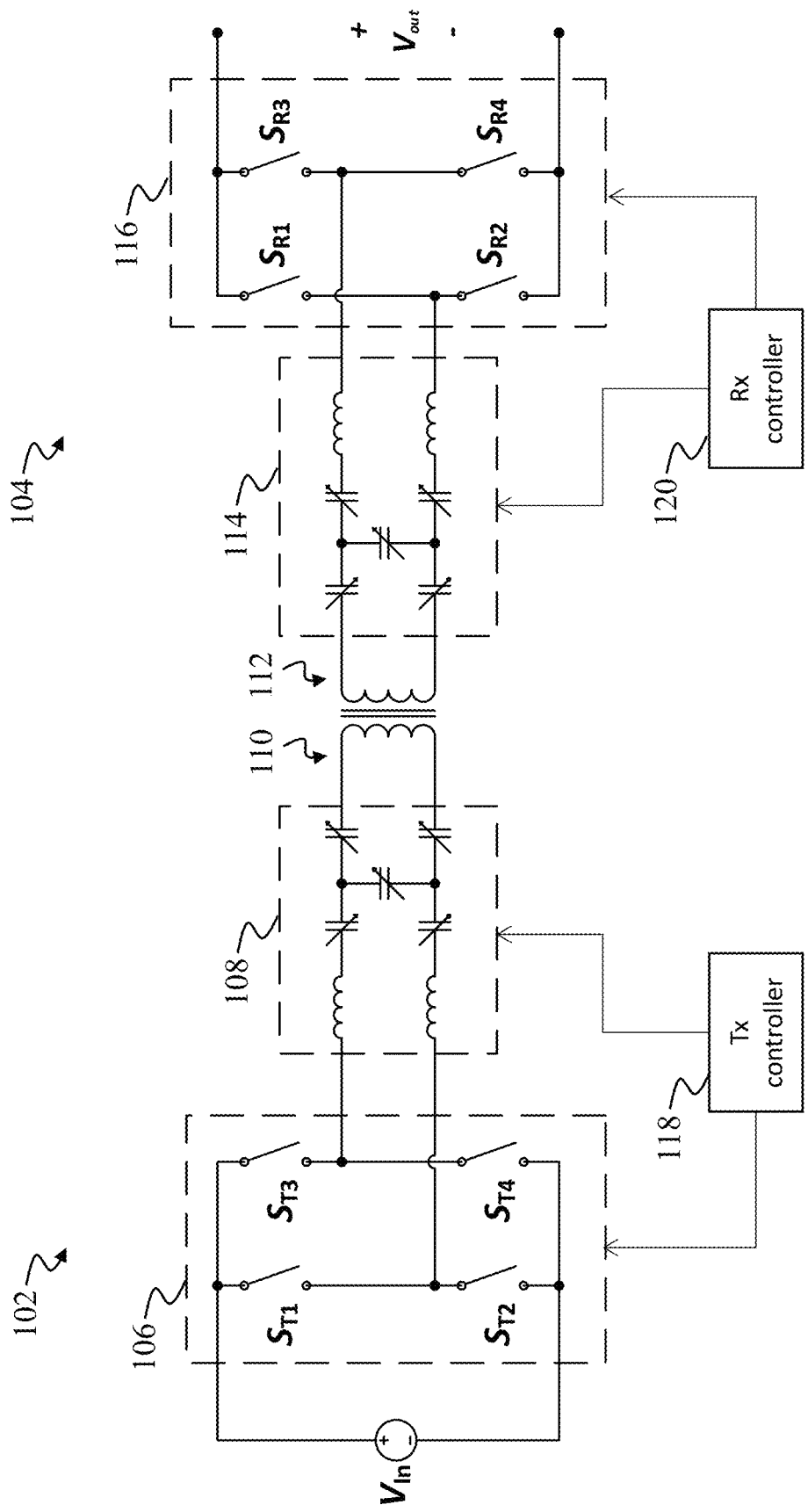
FIGS. 1-2 show diagrams of exemplary embodiments of wireless power systems.

FIG. 1 shows a diagram of an exemplary embodiment of a wireless power transmission system including a wireless power transmitter 102 and wireless power receiver 104. The wireless power transmitter 102 includes a full-bridge differential RF inverter 106 coupled to a transmitter impedance matching network (IMN) 108 and a transmitter resonator coil 110. The wireless power receiver 104 includes a receiver resonator coil 112 coupled to a receiver IMN 114 and an RF rectifier 116. The receiver 104 may be coupled directly to a load such as a battery or battery manager of an electronic device. Note that the components of the transmitter IMN 108 and/or receiver IMN 114 may be tunable. Further, the inverter 106 and/or rectifier 116 may be tunable. For example, the switches ($S_{T1}$, $S_{T2}$, $S_{T3}$, $S_{T4}$) of the inverter 106 and/or switches ($S_{R1}$, $S_{R2}$, $S_{R3}$, $S_{R4}$) of the rectifier 116 may be controllable by controllers 118 and 120, respectively, to achieve variable dead-time, phase-shifting, etc.

Figure 2:
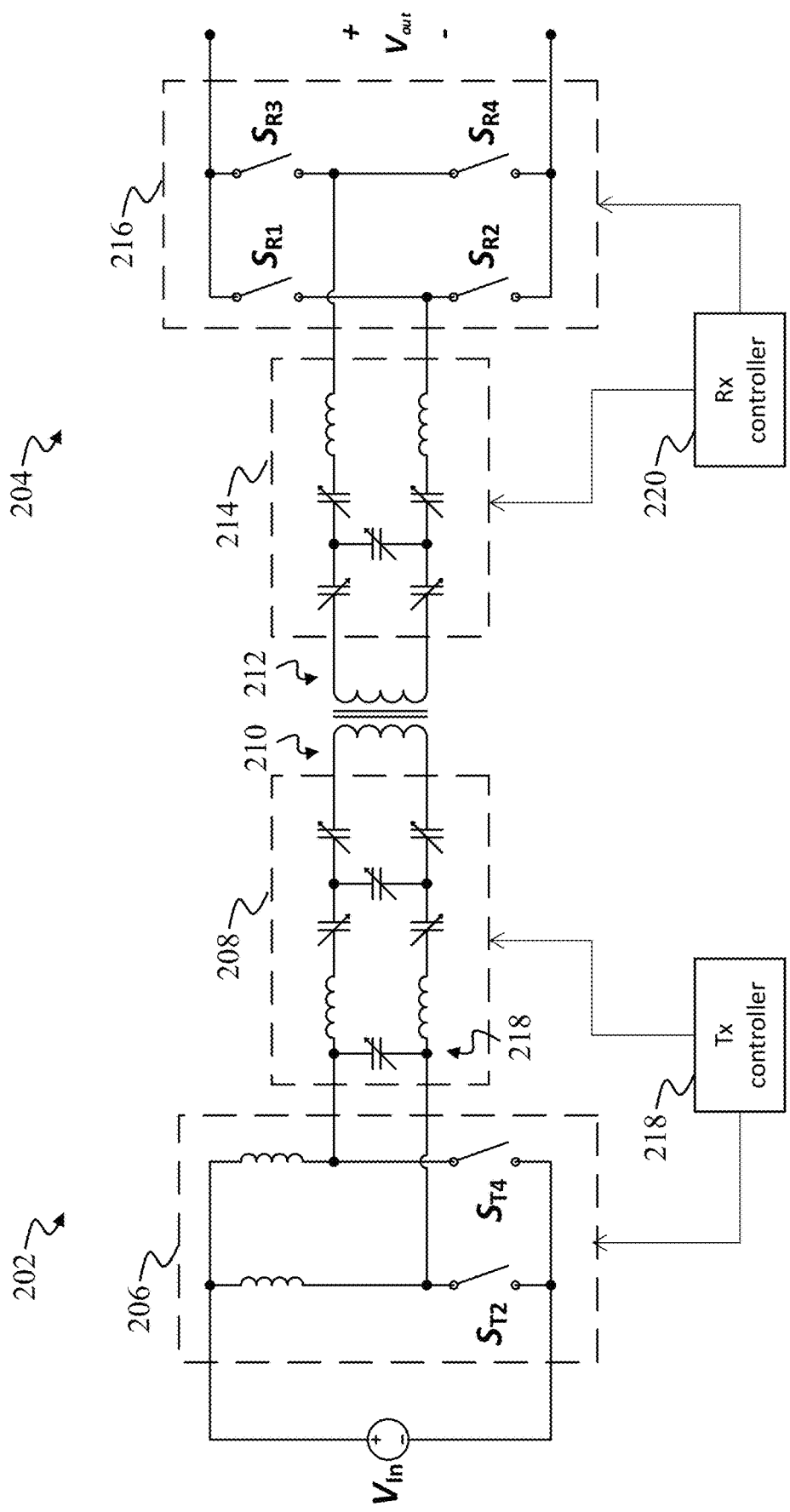

FIG. 2 shows a diagram of an exemplary embodiment of a wireless power transmission system including a wireless power transmitter 202 and wireless power receiver 204. The wireless power transmitter 202 includes a full bridge differential RF inverter 206 coupled to a transmitter impedance matching network (IMN) 208 and a transmitter resonator coil 210. The wireless power receiver 204 includes a receiver resonator coil 212 coupled to a receiver IMN 214 and an RF rectifier 216. The receiver 204 may be coupled directly to a load such as a battery or battery manager of an electronic device. Note that the components of the transmitter IMN 208 and receiver IMN 214 may be tunable. In some embodiments, IMN 208 can include a tunable or fixed shunt cap 218 for a differential class E or F inverter. Further, the inverter 206 and/or rectifier 216 may be tunable. For example, the switches ($S_{T1}$, $S_{T2}$) of the inverter 206 and/or switches ($S_{R1}$, $S_{R2}$, $S_{R3}$, $S_{R4}$) of the rectifier 216 may be controllable by controller 218 and 220, respectively, to achieve variable dead-time, phase-shifting, etc.

Figure 3A:
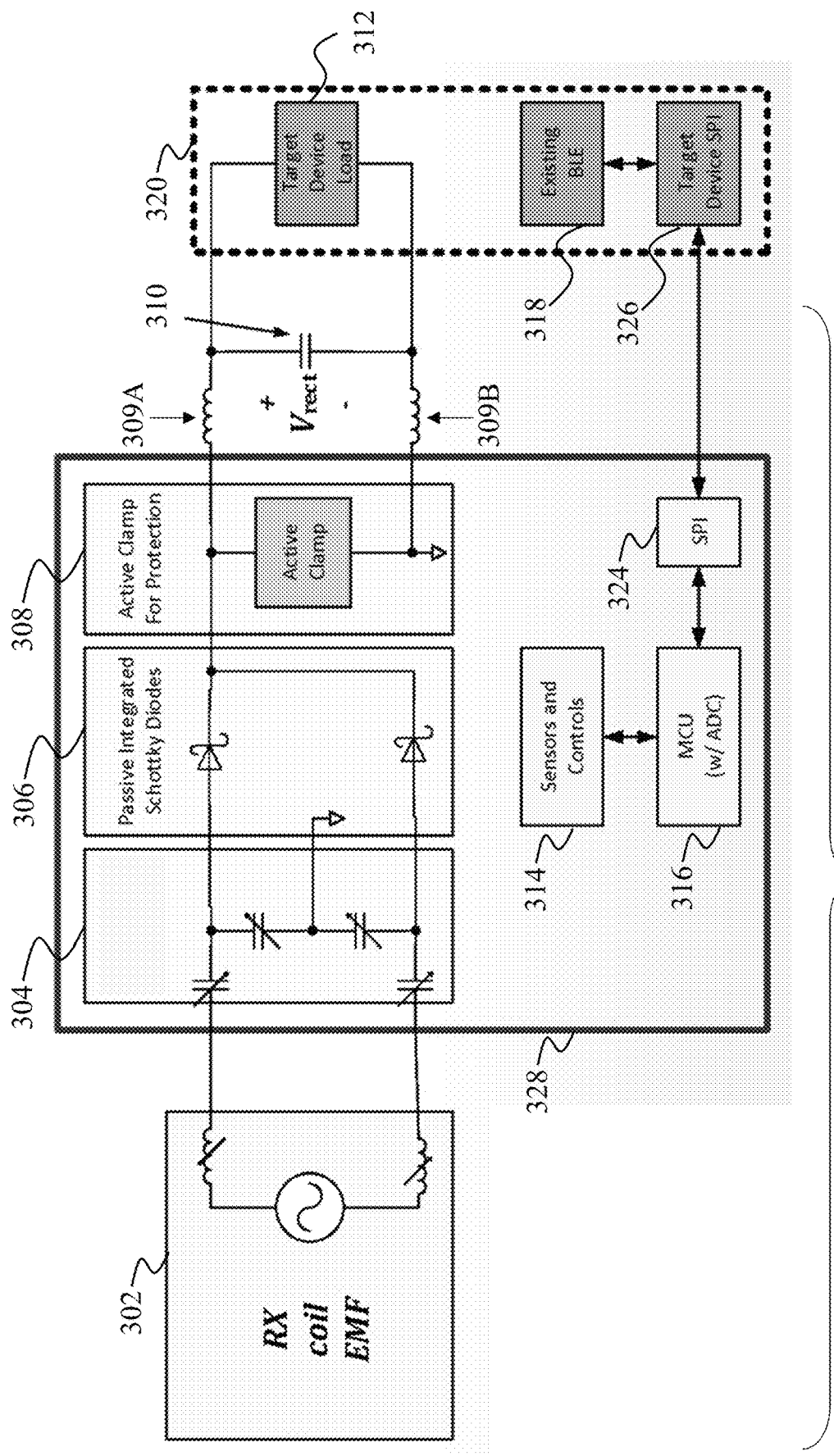
FIGS. 3A, 3B, and 4 show diagrams of exemplary embodiments of wireless power receivers.

FIG. 3A shows an exemplary embodiment of a wireless power receiver including a receiver resonator coil 302 coupled to one or more capacitors and impedance matching components 304, one or more diodes 306, active clamp 308, inductors 309A and 309B, smoothing capacitor 310, load 312, one or more sensors 314, controller 316, and a wireless communication module 318. In some embodiments, the wireless communication module 318 may be a wireless communication device (for example, Bluetooth Low Energy (BLE)) available on the electronic device 320 to which the receiver 322 is coupled. The active clamp 308 can be used as a circuit protection measure to ensure that voltage does not increase above a predetermined limit. The inductors 309A and 309B are used to filter out common-mode signals. The smoothing capacitor 310 can smooth ripple or variations in output rectifier voltage. In some embodiments, the connection between the controller and the BLE can be mediated via serial peripheral interface ports 324, 326 on the receiver 322 and electronic device. In some embodiments, the impedance matching components 304 may be variable capacitors, such as BST capacitors, PWM controlled capacitors, bank of capacitors, and the like. In some embodiments, the one or more diodes used to rectify the oscillating energy captured at the receiver resonator coil may be Schottky diodes. It can be advantageous to use Schottky diodes due to their low forward voltage drop and fast switching. Note that Schottky diodes can be used on one leg (top) of the circuit while the other leg is a short. This imbalanced loading approach can decrease complexity and cost of the circuit. In some embodiments, sensors can be used to sense current, voltage, and/or power along the current pathways within the receiver. An advantage to this system is that the voltage regulation is achieved at the IMN of the receiver, avoiding the use of a DC-DC converter. In some embodiments, one or more of the components coupled to the receiver resonator coil can be co-packaged into an application-specific integrated circuit (ASIC) 328. For example, an ASIC may include one or more impedance matching components 304, one or more diodes 306, active clamp 308, sensors 308, controller 316, and/or a wireless communication module.

Figure 3B:
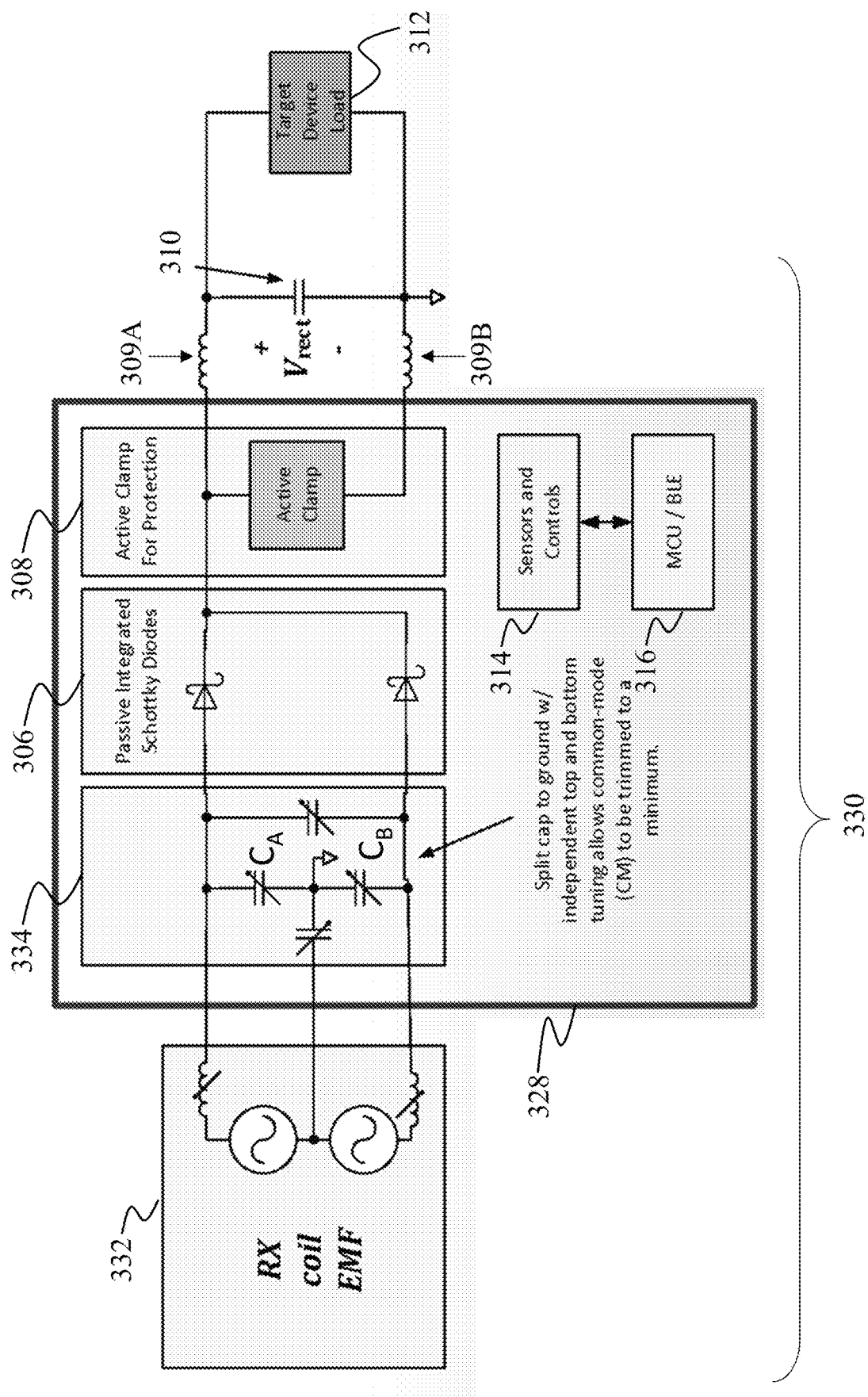

FIG. 3B shows an exemplary embodiment of a wireless power receiver including many of the components listed above for FIG. 3A. Some of the differences are described in the following. For example, the receiver 330 includes a "split-coil" receiver resonator coil 332. The split coil is coupled to capacitor configuration 334 that is connected to ground. This configuration can mitigate common-mode (CM) signal issues. Note that the tuning of the top capacitor can be independent from the bottom capacitor.

Figure 4:
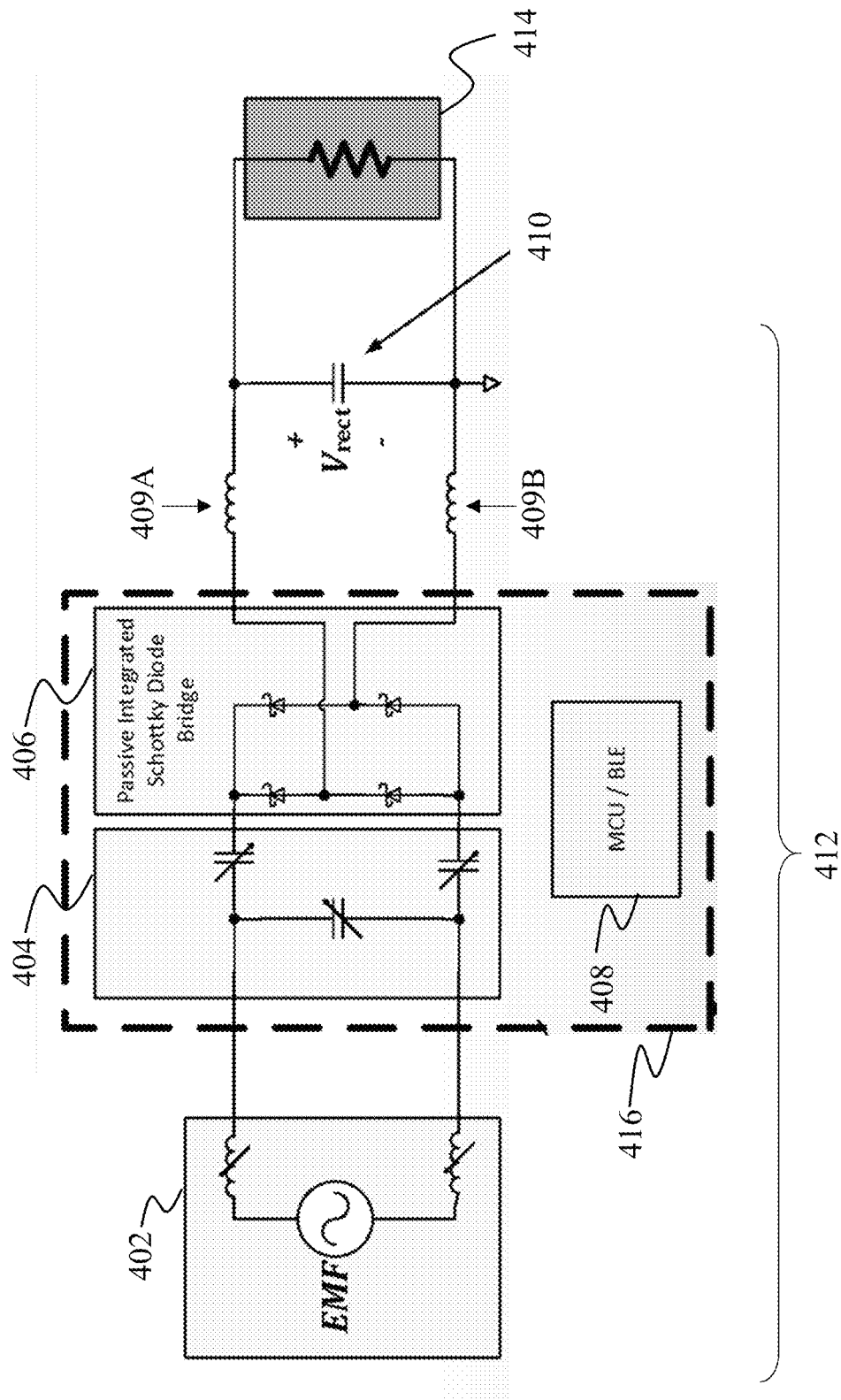

FIG. 4 shows an exemplary embodiment of a wireless power receiver including a receiver resonator coil 402 coupled to one or more capacitors and impedance matching components 404, a rectifying diode bridge 406, a controller/wireless communication module 408, inductors 409A and 409B, and a smoothing capacitor 410. The receiver 412 is coupled to a load 414 of an electronic device. In some embodiments, the diode bridge 406 can be a full-bridge rectifier having Schottky diodes. In some embodiments, the one or more components coupled to the receiver resonator coil 402 can be co-packaged into an ASIC 416.

Receiver Description

Figure 5:
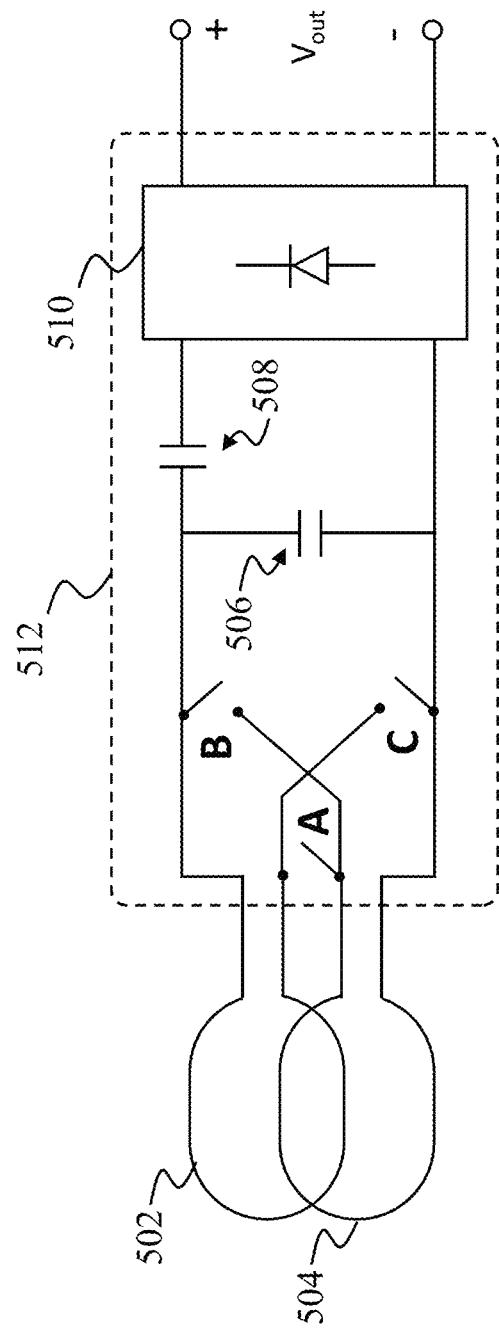
FIGS. 5, 6A, and 6B show diagrams of exemplary embodiments of capacitor networks for wireless power receivers.

FIG. 5 shows an exemplary embodiment of a wireless power receiver including one or more receiver resonator coils 502, 504 coupled to one or more capacitors 506, 508 and a rectifier 510 with an output to a load. The receiver resonator coils 502, 504 can be switched in and out to be in parallel or series and result in a different overall inductance. For example, when switch A is closed (and switches B, C are open), the coils 502, 504 are coupled in series. When switches B and C are closed (and A is open), the coils 502, 504 are coupled in parallel. Further, each of the coils 502, 504 can be activated independently by closing either switch B or C. The capacitors 506, 508 can be tunable capacitors. In some embodiments, the switches, capacitors, and rectifier can be packaged into an integrated circuit (such as an ASIC). In some embodiments, the rectifier may be an active rectifier using switches.

In exemplary embodiments, a wireless power receiver can include a receiver resonator coil coupled to a network of capacitors. In some embodiments, the network capacitors can include one or more switch or PWM controlled capacitors. These switch controlled capacitors may be activated when the wireless power transmission system is operating at lower frequencies, such as 100-300 kHz. In some embodiments, the capacitors can include one or more BST capacitors. The BST capacitors can be designed or chosen to have a quality factor $Q_{cap}$ equal to or greater than the quality factor of the resonator coil $Q_{coil}$. These tunable capacitors may be activated when the wireless power transmission system is operating at higher frequencies, such as 1 MHz to 2.4 GHz (for example, 6.78 MHz or 13.56 MHz). In some embodiments, the switched or tunable capacitor can be configured to operate at any ISM (Industrial, Scientific, or Medical) frequency band. This may allow the system to switch from one mode, for example, at 120 kHz, to another mode, at 6.78 MHz and have tuning capability at each of these modes.

Figure 6A:
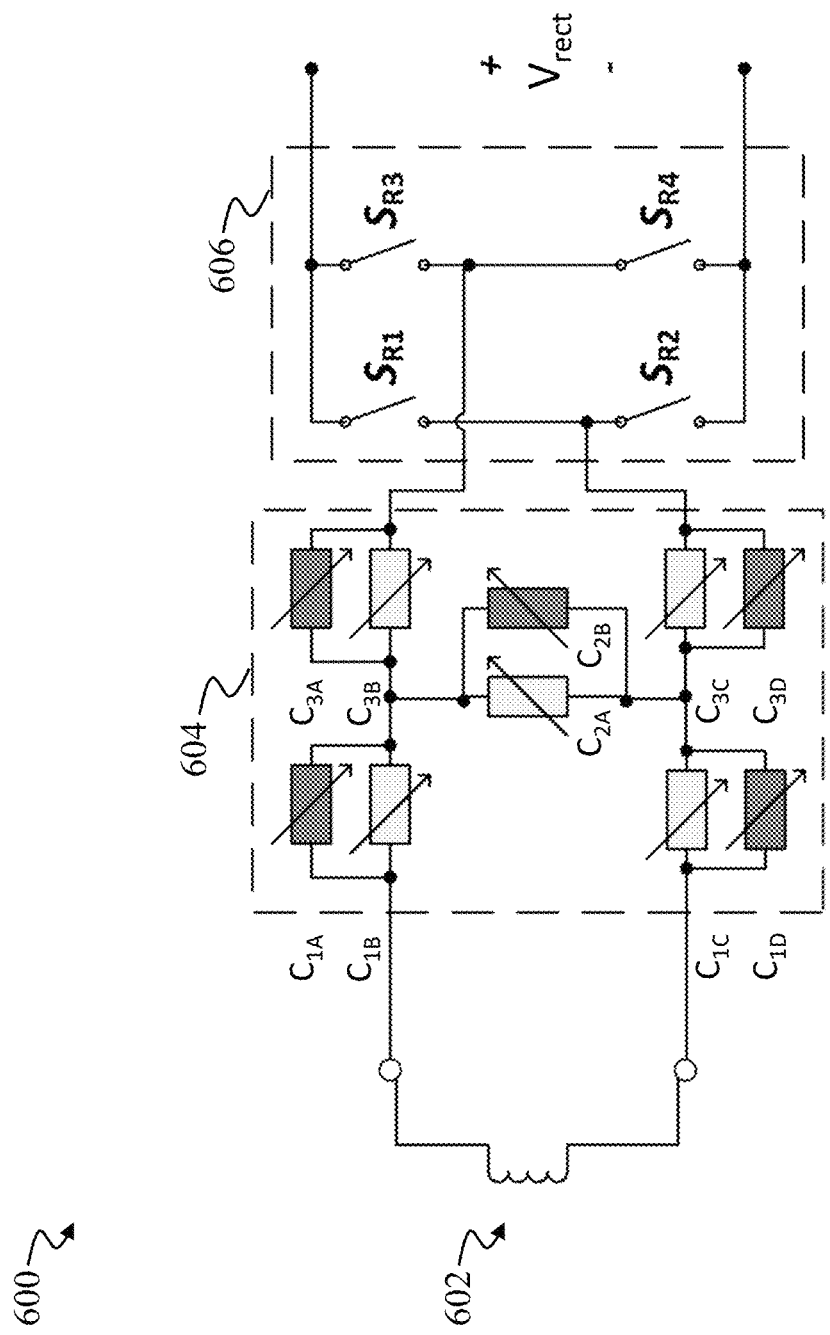

FIG. 6A shows an exemplary embodiment of a wireless power receiver 600 including a receiver resonator coil 602 coupled to a network of capacitors 604 and a rectifier 606 with an output to a load. The network of capacitors 604 can include any of the above described discrete or continuous tunable capacitors. In this example, a first subcircuit includes coil 602 coupled in series with capacitors $C_{1A}$, $C_{1B}$, $C_{1C}$, $C_{1D}$. A second subcircuit includes the first subcircuit coupled in parallel to capacitors $C_{2A}$, $C_{2B}$. A third subcircuit includes the second subcircuit coupled in series with capacitors $C_{3A}$, $C_{3B}$, $C_{3C}$, $C_{3D}$. This third subcircuit is coupled into a rectifier 606.

Note that capacitors $C_{1A}$ and $C_{1B}$ are connected in parallel to one another in the same position relative to coil 602. In some embodiments, capacitor $C_{1A}$ may be a discrete tunable capacitor while capacitor $C_{1B}$ may be continuous tunable capacitor. This can provide both "coarse" and "fine" tuning for a capacitance at position $C_1$. In some embodiments, capacitor $C_{1A}$ may be a type of capacitor that is suited for tuning at frequency or group of frequencies $f_1$ and capacitor $C_{1B}$ may be a type of capacitor that is suited for tuning at frequency or group of frequencies $f_2$. For example, if the wireless power receiver 600 detects, via wireless communication or impedance measurement, a transmitter capable of transmitting power at frequency $f_1$, then the receiver 600 may switch in capacitor $C_{1A}$ (and may keep capacitor $C_{1B}$ switched out). If the receiver 600 detects a transmitter capable of transmitting power at frequency $f_2$, then the receiver 600 may switch in capacitor $C_{1B}$ (and may keep capacitor $C_{1A}$ switched out). Similar embodiments are relevant for each of the capacitors connected in parallel ($C_{1C}$ and $C_{1D}$, $C_{2A}$ and $C_{2B}$, $C_{3A}$ and $C_{3B}$, $C_{3C}$ and $C_{3D}$). Note that capacitors $C_{1A}$ and $C_{1B}$ are balanced with $C_{1C}$ and $C_{1D}$. This can mitigate common mode signal issues. In some embodiments, one or more of these components along with the rectifier 608 may be packaged into an integrated circuit 610.

In some embodiments, the capacitors in network 604 can include one or more switch or PWM controlled capacitors, respectively. These switch controlled capacitors may be activated when the wireless power transmission system is operating at lower frequencies, such as 100-300 kHz. In some embodiments, the capacitors in network 604 can include one or more BST capacitors, respectively. The BST capacitors can be designed or chosen to have a quality factor $Q_{cap}$ equal to or greater than the quality factor of the resonator coil $Q_{coil}$. These tunable capacitors may be activated when the wireless power transmission system is operating at higher frequencies, such as 1 MHz-2.4 GHz (for example, 6.78 MHz or 13.56 MHz). In some embodiments, the switched or tunable capacitor can be configured to operate at any ISM (Industrial, Scientific, or Medical) frequency band. This may allow the system to switch from one mode, for example, at 120 kHz, to another mode, at 6.78 MHz and have tuning capability at each of these modes. For example, capacitor $C_{1A}$ may be a PWM controlled capacitor with f1=100-300 kHz and capacitor $C_{1B}$ may be a BST capacitor with f2=1 MHz-2.4 GHz.

Figure 6B:
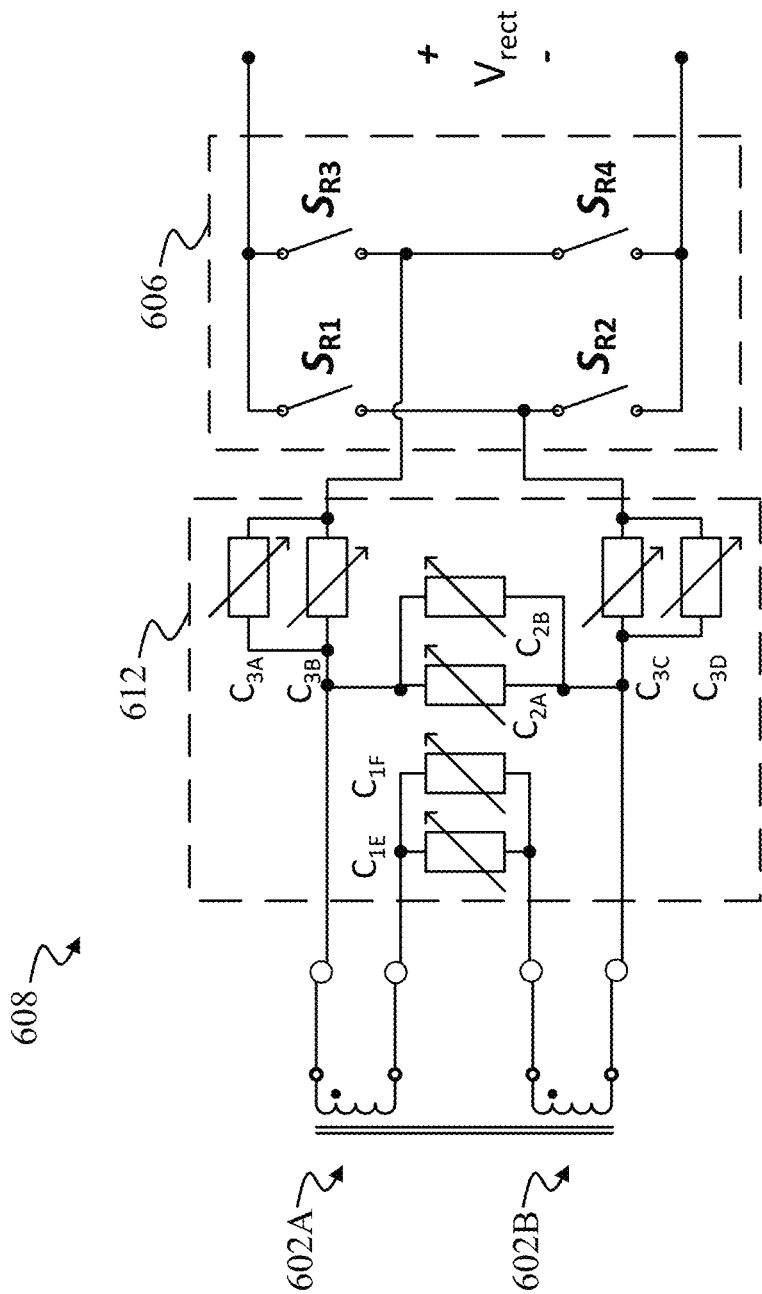

FIG. 6B shows an exemplary embodiment of a wireless power receiver 608 including a "split" receiver resonator coil 602A, 602B coupled to a network of capacitors 612 and a rectifier 614 with an output voltage $V_{rect}$ to a load. In this example, a first subcircuit includes coil 602A, 602B coupled in series with capacitors $C_{1E}$, $C_{1F}$. A second subcircuit includes the first subcircuit coupled in parallel to capacitors $C_{2A}$, $C_{2B}$. A third subcircuit includes the second subcircuit coupled in series with capacitors $C_{3A}$, $C_{3B}$, $C_{3C}$, $C_{3D}$. This third subcircuit is coupled into a rectifier 606. Note that capacitors $C_{1E}$ and $C_{1F}$ are connected in parallel to one another. As described above for capacitors $C_{1A}$ and $C_{1B}$, $C_{1E}$ and $C_{1F}$ can be different types of capacitors or can be configured to be activated or switched in at different frequencies. In some embodiments, particular sets of capacitors may be switched in or out based on the detection of a protocol or standard of wireless power transmission that the transmitter utilizes.

Tuning Configurations

Figure 7:
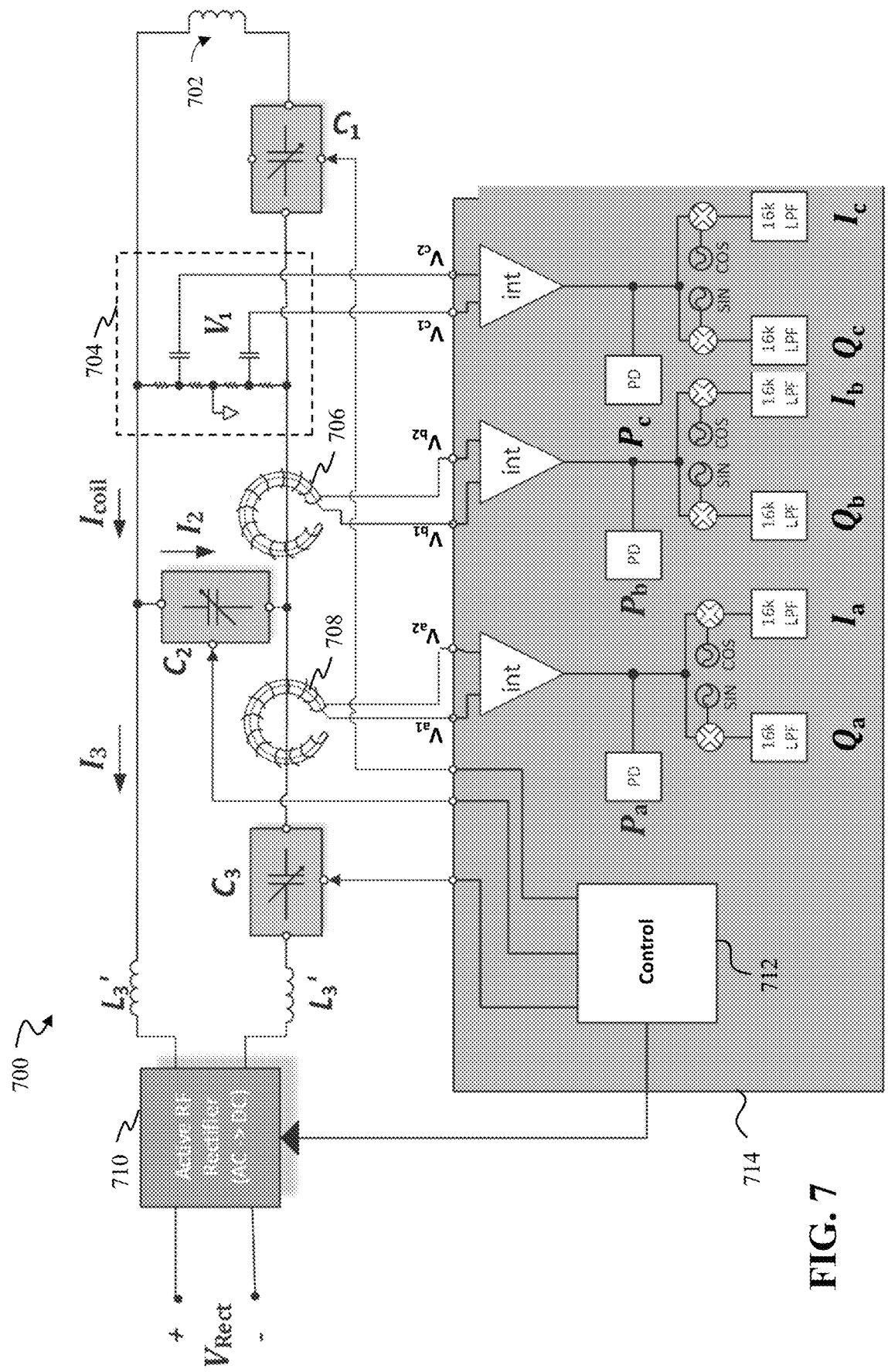
FIG. 7 shows a diagram of an exemplary embodiment of a wireless power receiver coupled to control and logic circuitry.

FIG. 7 shows an exemplary embodiment of a receiver 700 with a tunable impedance matching network. The receiver 700 includes a resonator coil 702 coupled in series to capacitor $C_1$. Next, connected in parallel to the resonator coil and $C_1$, is a voltage sensor 704 that measures voltage $V_1$. The differential voltage measurements $V_{c1}$, $V_{c2}$ are fed into integrator INT. In some embodiments, a peak detector PD is used to detect the amplitude P (as function of time) of the measured voltage signal $V_1$. The voltage signal is also fed into a mixer (SIN and COS) and one or more filters (LPF) to detect the phase of the voltage signal $V_1$. Refer to the "Mixer Operation" section below for description related to the function and outputs of phase detection. The amplitude and phase measurements can be used by a controller to tune system components, such as the tunable capacitors $C_1$, $C_2$, and $C_3$, or control other parts of the receiver, such as rectification or safety mechanisms.

Next, coupled in parallel to the voltage sensor 704 is capacitor $C_2$. A current sensor 706 can be positioned between voltage sensor 704 and capacitor $C_2$ to measure coil current $I_{coil}$. Coupled in series to the $C_2$ is a capacitor $C_3$. A current sensor 708 can be positioned between $C_2$ and $C_3$ to measure current $I_3$. Each of these current sensors 706 and 708 can be connected to amplitude and phase measurement circuits as described above for voltage sensor 704. Coupled in series to capacitor $C_3$ is inductor $L'_3$ (balanced) and rectifier 710. In some embodiments, the rectifier 710 can be an active rectifier, such as a synchronous rectifier. The rectified voltage output $V_{rect}$ may be fed directly to a load or though other circuitry, such as voltage clamps or filters (see FIGS. 3A, 3B, and 4).

In some exemplary embodiments, tunable capacitors $C_1$, $C_2$, and $C_3$ may be controlled by a controller 712. Note that the outputs of the various sensors 704, 706, and 708 can be fed into component 712. The controller 712 in addition to some or all of components INT, PD, SIN and COS, and LPF may be integrated into an integrated circuit 714, such as an ASIC.

Mixer Operation

The input signal may be a signal representing a measured current or voltage at a location within a power transfer system. The input signal may be, for example, a voltage signal representing a measured current or voltage at a location within a power transfer system, and can be represented by $A_{IN}*\sin(\omega t+\varphi)$, where $\varphi$ is the phase of the input signal relative to the reference signals. For example, the input signal can be the output of a Rogowski coil positioned within the circuitry of a power transfer system to measure a current signal.

The signal mixers are coupled with the signal supply (such as the voltage signal $V_1$) so as to receive one of the reference signals as one input and the input signal as another input. The mixers (SIN and COS) mix (e.g., perform time-domain multiplication) a respective reference signal with the input signal and output mixed signal 1 and 2. Thus, mixed signal 1 can be represented by:

$$Q = A_{IN}*\sin(\omega t+\varphi)*A*\sin(\omega t) = \frac{AA_{IN}}{2}*\cos(\varphi) - \frac{AA_{IN}}{2}*\cos(2\omega t+\varphi),$$

and mixed signal 2 can be represented by:

$$I = A_{IN}*\sin(\omega t+\varphi)*A*\cos(\omega t+\theta) =$$
$$\frac{AA_{IN}}{2}*\sin(\varphi-\theta) + \frac{AA_{IN}}{2}*\sin(2\omega t+\varphi+\theta).$$

Filters (LPF) can be low-pass filters designed to filter, for example, the second harmonic from the first and the second mixed signal that is generated by the mixers. Accordingly, the filters may remove the second order harmonics generated from the signal mixing process as well as any higher order harmonics that were present in either reference signals or the input signal. After filtering, mixed signal 1 can be represented by:

$$Q = \frac{AA_{IN}}{2} * \cos(\varphi),$$

and mixed signal 2 can be represented by:

$$I = \frac{AA_{IN}}{2} * \sin(\varphi - \theta).$$

The controller receives the mixed signals Q and I, determines the phase of the input signal, and outputs the phase of the input signal to, for example, IMN control circuitry. Impedance at the operating frequency can be determined using a ratio of Q to I. In some embodiments, the impedance can be input to detection algorithms such as rogue object detection, foreign object detection, RFID detection, proximity detection, coil alignment, and the like.

Exemplary Relationships

FIG. 8A shows a receiver resonator coil $L_1$ coupled in series to a tunable capacitor $C_1$. The foregoing circuit is coupled to a rectifier 802 with an output of a rectified voltage $V_{rect,1}$. FIG. 8B shows rectified voltage as a function of tuning $C_1$ for the circuit of FIG. 8A coupled to a load at the output 804 of the rectifier. Note that the peak of the rectified voltage $V_{rect,1}$ can be at most the voltage $V_{peak,1}$ induced by the transmitter on the receiver resonator coil $L_1$. This condition may be met when inductor $L_1$ is at resonance with capacitor $C_1$, when impedance is at its lowest. For example, if $V_{rect,1}$ is too high, $C_1$ may be tuned away or detuned from resonance with $L_1$ to decrease $V_{rect,1}$.

FIG. 8C shows a receiver resonator coil $L_1$ coupled in parallel to capacitor $C_2$. The foregoing circuit is coupled to a rectifier 802 with an output of a rectified voltage $V_{rect,2}$. FIG. 8D shows that rectified voltage $V_{rect,2}$ is at its maximum $V_{peak,2}$ when capacitor $C_1$ is at resonance with inductor $L_1$ for the circuit of FIG. 8C coupled to a load at the output 804 of the rectifier. Note that:

$$V_{peak,2} \gg V_{peak,1}$$

Thus, this circuit can be considered a "boost" to the voltage supplied by the transmitter.

Figure 8F:
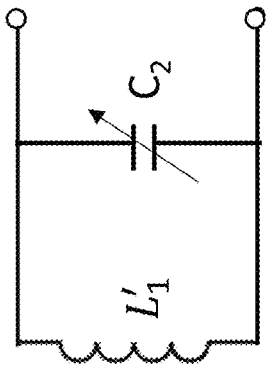
FIG. 8F shows a diagram of an equivalent circuit for the receiver shown in FIG. 8E.
Figure 8E:
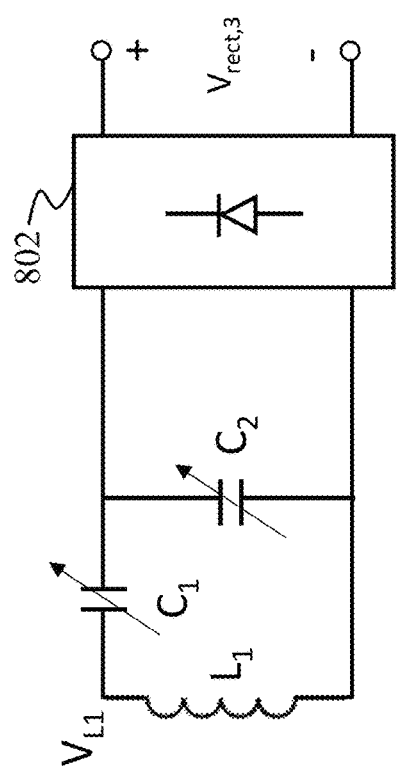
Figure 8H:
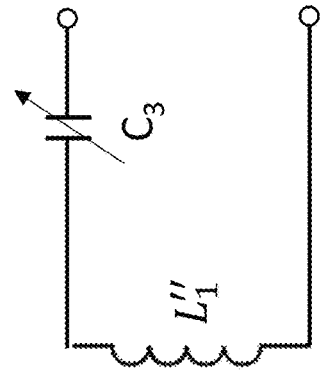
FIG. 8H shows a diagram of an equivalent circuit for the receiver shown in FIG. 8G.
Figure 8G:
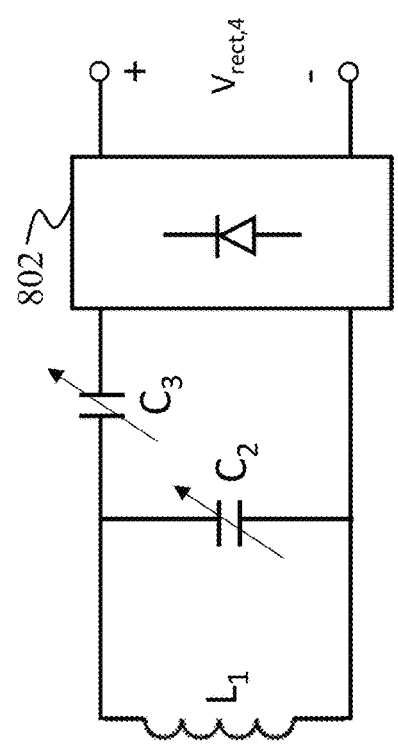

In some embodiments, rectified voltage $V_{rect,2}$ may be too large and an additional series element, such as capacitor $C_1$, as shown in FIG. 8E, or capacitor $C_3$, as shown in FIG. 8G, may be utilized. FIG. 8E shows a receiver resonator coil $L_1$ coupled in series with capacitor $C_1$ and in parallel with capacitor $C_2$. The foregoing circuit is coupled to a rectifier 802 with an output of a rectified voltage $V_{rect,3}$. Note that capacitors $C_1$ and $C_2$ can be used resonate with $L_1$ in different ratios. Similarly, these capacitors can be used to detune the resonator in different ratios.

FIG. 8F shows an equivalent circuit for FIG. 8E where $L'_1$ is the series equivalent of inductance $L_1$ and capacitance $C_1$:

$$Z_{series\_equiv} = Z_{L1} + Z_{C1} = j\omega L_1 + \frac{1}{j\omega C_1} = j\omega L'_1.$$

Inductance $L'_1$ is less than inductance $L_1$ leading to a lower rectified voltage. Overall, the peak $V_{peak,3}$ of rectified voltage $V_{rect,3}$ can be approximately described by the following:

$$V_{peak,2} \geq V_{peak,3} \geq V_{peak,1}$$

When inductor $L_1$, capacitor $C_1$, and capacitor $C_2$ are at resonance, $V_{rect,3}$ increases with an increase in $C_1$. Note that capacitance $C_2$ has a correlating decrease with an increase in $C_1$. For example, this relationship can be determined by voltage division:

$$V_{rect,3} = V_{L1} \cdot \frac{Z_{C2}}{Z_{C2} + Z_{C1}}$$

where $V_{L1}$ is the voltage at the node between inductor $L_1$ and capacitor $C_1$. Simplifying the above using equalities $$Z_{C1} = \frac{1}{j\omega C_1} \text{ and } Z_{C2} = \frac{1}{j\omega C_2},$$

it is shown that $V_{rect,3}$ is proportional to $C_1$:

$$V_{rect,3} = V_{L1} \cdot \frac{C_1}{C_1 + C_2}.$$

FIG. 8G shows a receiver resonator coil $L_1$ coupled in parallel to $C_2$. Coil $L_1$ and $C_2$ are coupled in series to $C_3$. The foregoing circuit is coupled to a rectifier 802 with an output of a rectified voltage $V_{rect,4}$. As described for the above circuits, parallel capacitor $C_2$ can boost the rectified voltage. In some embodiments, series capacitor $C_3$ can compensate for a varying load.

FIG. 8H shows an equivalent circuit for FIG. 8G where $L''_1$ is the parallel equivalent of inductance $L_1$ and capacitance $C_2$:

$$Z_{parallel\_equiv} = \frac{Z_{L1} Z_{C2}}{Z_{L1} + Z_{C2}} = \frac{j\omega L_1 * \frac{1}{j\omega C_2}}{j\omega L_1 + \frac{1}{j\omega C_2}} = \frac{j\omega L_1}{-\omega^2 L_1 C_2 + 1} = j\omega L''_1.$$

Inductance $L''_1$ is greater than inductance $L_1$ leading to a higher rectified voltage. Note that capacitor $C_3$ in the receiver matching network can maximize the current to the load. In some embodiments, the tuning of capacitor $C_3$ in the receiver matching network can increase or decrease the overall Thevenin output impedance of the receiver. A tunable capacitor $C_3$ can also be used to compensate for the detuning of inductor $L_1$. Overall, the peak $V_{peak,4}$ of rectified voltage $V_{rect,4}$ can be approximately described by the following:

$$V_{peak,2} \geq V_{peak,4} \geq V_{peak,1}.$$

When inductor $L_1$, capacitor $C_2$, and capacitor $C_3$ are at resonance, an unloaded $V_{rect,4}$ increases with an increase in $C_2$ until the value of $C_2$ is equal to a resonating capacitance $C_{2\_resonant}$. A loaded Vrect,4 increases and decreases before C2 reaches the resonating value C2_resonant (see FIG. 13). Note that capacitance $C_3$ has a correlating decrease with an increase in $C_2$. For example, the sum capacitance $C_2+C_3$ can remain approximately constant while adjusting $C_2$ and $C_3$. A higher rectified voltage can be achieved from higher $C_2$ and lower $C_3$ values for a $C_2$ value less than $C_{2,critical}$. $C_{2,critical}$ can be defined as the capacitance that maximizes the voltage independent of power efficiencies.

In some embodiments, the receiver-side capacitors are kept tuned to resonance to maximize efficiency. In some embodiments, if the receiver is detuned, the receiver-side capacitors may be retuned as a first step. If resonance cannot be achieved at the receiver, then the receiver may communicate with the transmitter to tune the transmitter-side capacitors.

Control Schemes

Figure 9:
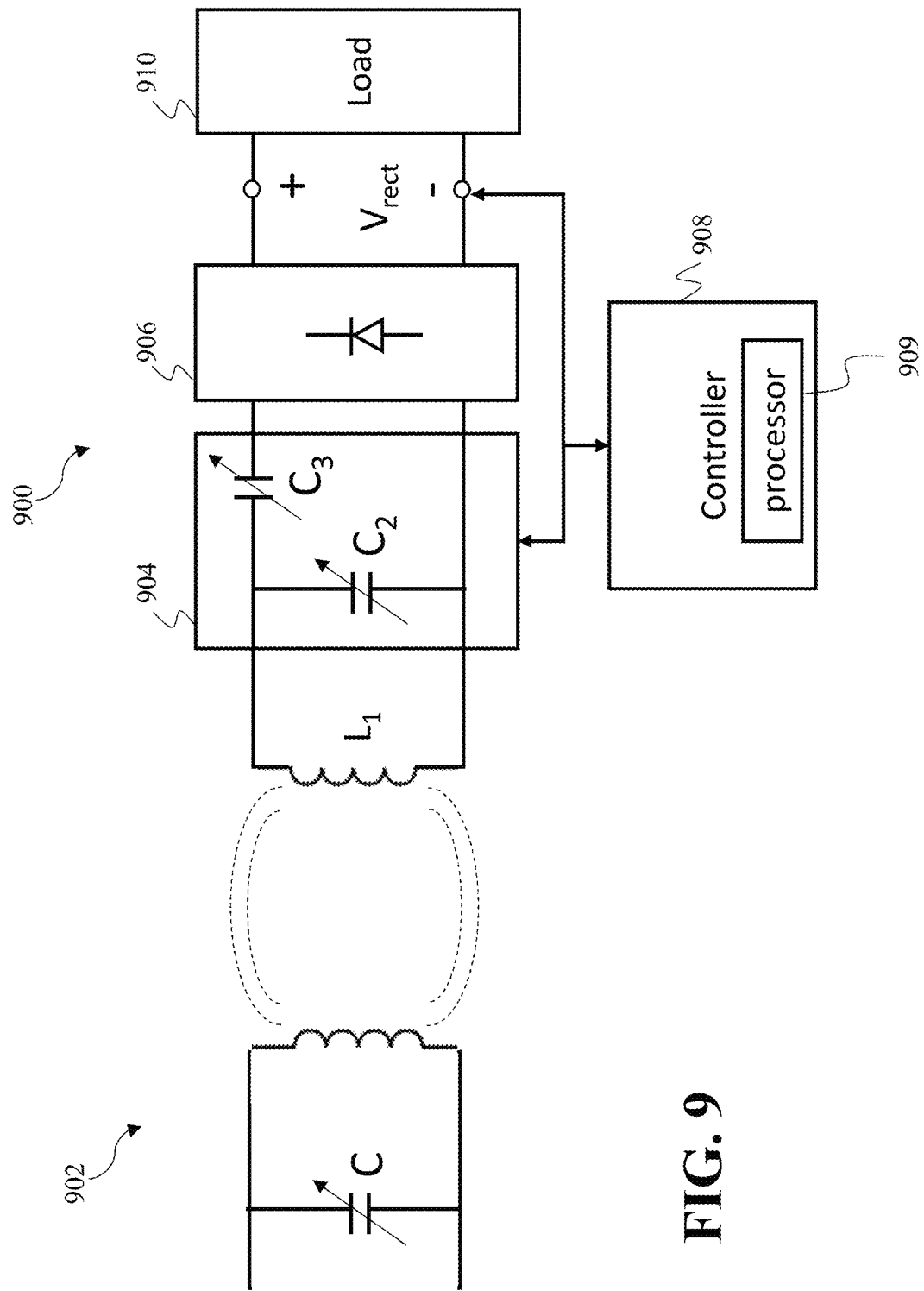
FIG. 9 shows a diagram of an exemplary embodiment of a wireless power system.

FIG. 9 shows an exemplary embodiment of a wireless power receiver 900 receiving wireless power from a power transmitter 902. The receiver includes a receiver resonator coil $L_1$, impedance matching network (IMN) 904, rectifier 906, and controller 908. In some embodiments, the controller 908 includes a processor 909. In some embodiments, the controller 908 can be coupled to a processor 909. The receiver can be coupled to a load 910 in an electronic device such as the battery of a cell phone, laptop, tablet, and the like. In some embodiments, the controller 908 can be coupled to sensors (such as current and voltage sensors) that provide measurements to a control loop. In some embodiments, the controller 908 can tune elements of the IMN 904 to regulate the power to the load 910 and/or achieve high efficiency power transmission to the load 910. The controller 908 can be integrated within or coupled to a wireless communication module (such as a Bluetooth module). In some embodiments, a voltage clamp can be included for start-up conditions (for example, with a large initial spike in voltage) and potential error conditions.

The exemplary system utilizes a feedback loop to control components of the IMN 904 of the wireless power receiver 900 to optimize the power efficiency of the receiver. The components of the IMN 904 can be inductors and/or capacitors and the value of these components can be changed in a discrete or continuous fashion. One implementation of this approach is where the IMN is formed with variable capacitors, such as BST capacitors, PWM-controlled capacitors, or another implementation is where the IMN is formed with an array or bank of discrete capacitors using switches to change the value of the capacitance.

Tuning Loop #1: Maximize System Efficiency

Figures 10A, 10B, 10C:
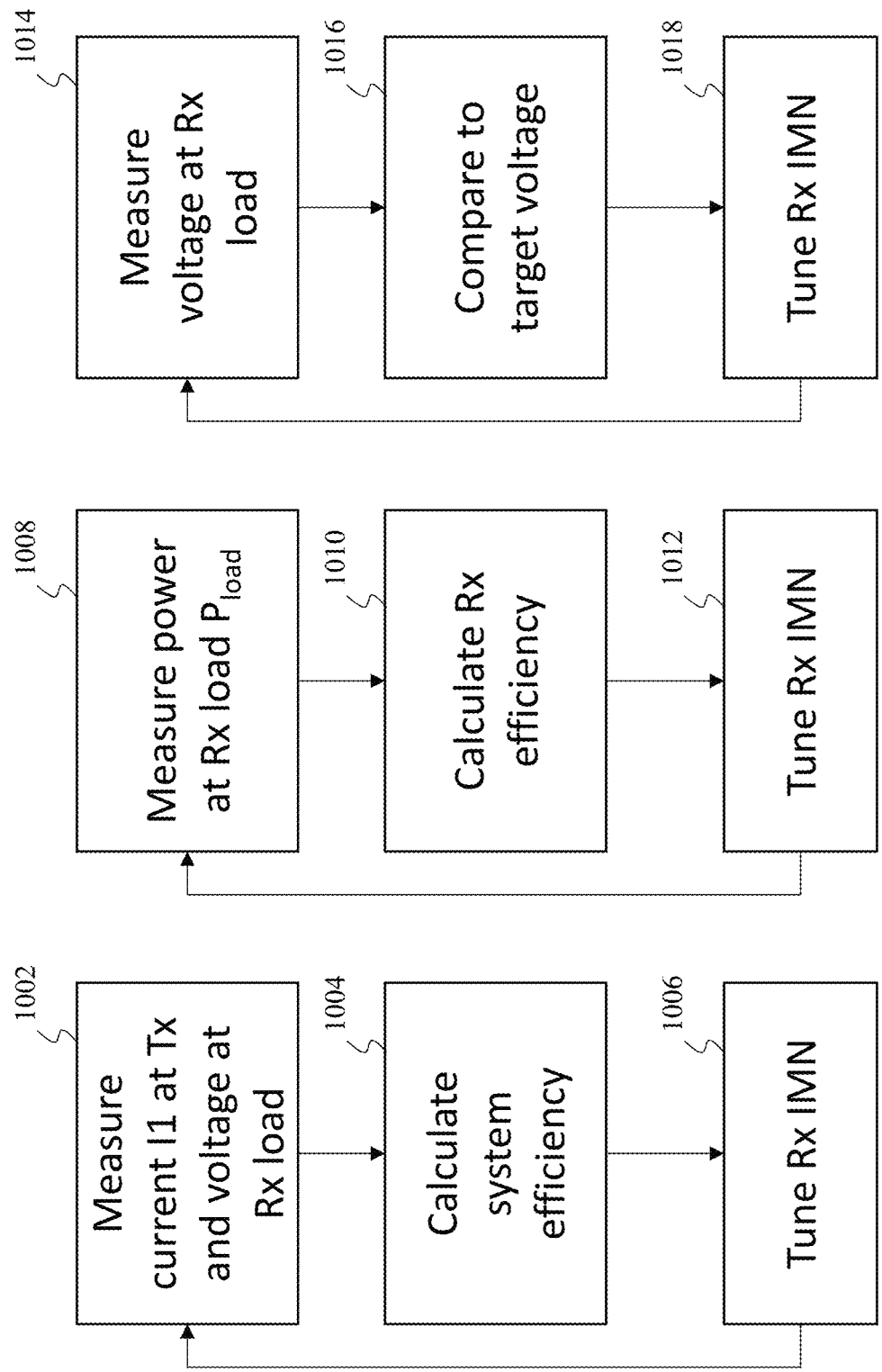
FIGS. 10A, 10B, 10C, and 11 show flowcharts of exemplary embodiments of control schemes for tuning wireless power receivers.

FIG. 10A shows an exemplary embodiment of a control loop to tune the receiver IMN 904. In some exemplary embodiments, the tunable IMN can be controlled by a control loop that includes feedback information from the wireless power transmitter 902 and information at the receiver load 910 to optimize the system efficiency. System efficiency can be defined as the ratio of power into the load at the receiver to input power at the transmitter, $P_{load}/P_{in}$. The control loop can change the components of the receiver IMN 904 such that the efficiency $P_{load}/P_{in}$ is maximized. For example, a voltage, current, or power sensor at the input power to the transmitter can measure or calculate input power. A voltage, current, or power sensor at the input to the load 910 can measure or calculate output power. A processor within a controller or coupled to the controller can calculate system efficiency using the above ratio. The controller can, in response, adjust the components $C_2$ and/or $C_3$ of the receiver IMN 904.

In another example, in a first step 1002, if other measurements are known (such as resistance of the transmitter coil) current $I_1$ in the transmitter resonator coil can be measured and an input power $P_{in,Tx\_coil}$ can be calculated. The output voltage $V_{out}$ can be measured at the receiver load 910 and output power $P_{load}$ can be calculated using an additional current or resistance measurement. In a second step 1004, the processor can calculate the system efficiency by taking the ratio $P_{load}/P_{in,Tx\_coil}$. In a third step 1006, the controller can, in response, adjust the components $C_2$ and/or $C_3$ of the receiver IMN 904. In some embodiments, the controller can adjust $C_2$ and measure the effect on the output voltage. If the outcome is not desired, the controller may return $C_2$ to its previous value and/or adjust $C_3$ and measure the effect on the output voltage until a desired outcome is achieved.

Tuning Loop #2: Maximize Power Delivered to the Load

FIG. 10B shows an exemplary embodiment of control loop to tune the receiver IMN 904. In some exemplary embodiments, a receiver control loop can maximize power delivered to the load 910. This can be as part of the control loop in maximizing system efficiency or a local control loop at the receiver. If the power transmitted from the wireless power transmitter is approximately constant, then the receiver can have a local control loop to maximize $P_{load}$. This can decrease complexity and computational effort. Note that the feedback loop can be implemented in an analog, digital, or mixed-signal (analog and digital) circuits with or without a controller. In a first step 1008, voltage, current, or power can be measured or calculated at the input to the load 910. In a second step 1010, the efficiency of the receiver can be calculated assuming that a constant current at the transmitter. In another embodiment, the efficiency of the receiver can be calculated by taking a voltage, current, and/or power measurement at the receiver resonator coil and calculating an input power $P_{in,Rx\_coil}$ and comparing to $P_{load}$. In a third step 1012, the controller can, in response, adjust the components $C_2$ and/or $C_3$ of the receiver IMN 904.

Tuning Loop #3: Achieve Target Voltage for the Load

FIG. 10C shows an exemplary embodiment of control loop to tune the receiver IMN 904. In some exemplary embodiments, a receiver control loop can tune the IMN 904 to hit a target voltage $V_{target}$ for the load 910. For example, a target voltage $V_{target}$ could be a voltage at or near the maximum input voltage $V_{max}$ of the load 910. By driving the wireless power receiver output to the maximum input voltage $V_{max}$ of the load (such as a battery charger input), the wireless power receiver efficiency is optimized. Also, with such a control technique, the use of a DC-to-DC converter can be avoided and thus, the efficiency of the wireless power receiver can be further optimized. In other words, the losses that may be attributable to a DC-to-DC converter may be avoided. An advantage of tuning the receiver IMN 904 based on the load voltage is that the rectifier output can be ensured to be in a safe operating region. The safe operating region can be ensured because the feedback loop is adjusting the IMN 904 components such that the rectifier output achieves the target load voltage $V_{target}$.

For example, assume the load of the wireless power receiver is a battery charging integrated circuit with a maximum input voltage of 20V. The target load voltage $V_{target}$ ideally can be 20V but will likely be set to a lower voltage, for example 19V, due to ripple and other non-idealities coming from the rectifier. The controller 908 on the wireless power receiver can be a negative feedback loop that regulates the rectifier output voltage to the target load voltage. The loop would compare the rectifier output voltage and compare it to the target voltage, in this example 19V, to generate an error signal. This error signal would then change the components of the IMN 904 (for example, capacitors $C_2$ and $C_3$) such that the rectifier output voltage is equal to the target voltage, resulting in no error signal. Implementation of the feedback loop can be implemented in the analog domain using operational amplifiers and PWM signals with variable capacitors and/or in the mixed signal analog and digital domain using analog-to-digital converters, comparators, microcontrollers, digital logic, firmware, switches and capacitor banks. In some embodiments, a combination of continuously variable capacitors for fine tuning while switches and capacitor banks can be used for coarse tuning. For example, if the wireless power receiver can be embedded into a pre-defined system, for example a laptop, cell phone, etc., the target voltage can be known a priori and can be easily inputted or programmed into the controller or memory unit. In some embodiments, the target voltage does not need to be static and can be changed, for example, by a user of the system or different safety conditions.

Figure 11:
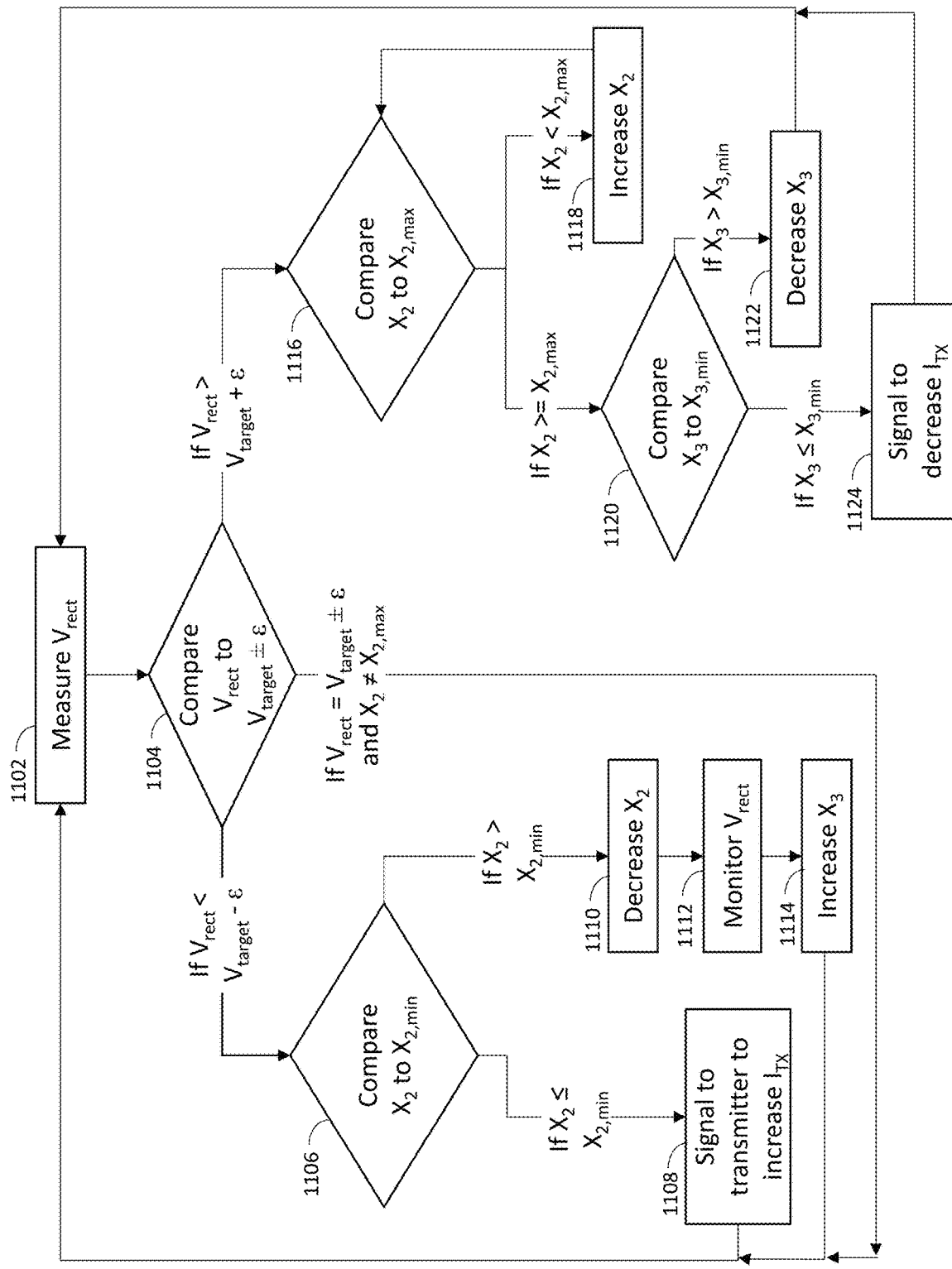

FIG. 11 shows an exemplary embodiment of a control scheme for the regulation of rectified voltage of a wireless power receiver. Inputs to this control scheme can come from measurements (i.e. from sensors) of rectified voltage $V_{rect}$, currents $I_1$, $I_2$, $I_3$ (see FIG. 7), and/or voltages in the matching network. At step 1102, rectified voltage is measured and, at step 1104, compared to a target voltage $V_{target}$, within some error, hysteresis, or approximation interval±c. In some embodiments, target values of rectified voltage can be 1V, 5V, 10V, and 20V in consumer electronics such as mobile electronics and laptops. In some embodiments, this interval c can be 1%, 5%, 10%, or more of target voltage $V_{target}$. For example, for an analog voltage measurement, this interval can be 10-100 mV in a 10V system. If the voltage measurement is a digital signal, comparison of $V_{rect}$ to $V_{target}$ can depend on number of bits or quantization, at or above noise floor.

If $V_{rect}$ is less than $V_{target}$−ε, at step 1106, reactance $X_2$ of capacitor $C_2$ is compared to a minimum reactance value $X_{2,min}$. If $X_2$ is less than or equal to $X_{2,min}$, at step 1108, transmitter current $I_x$ can be increased. In some embodiments, the receiver can signal the transmitter to increase $I_x$. In some embodiments, the transmitter can detect the measurements at the receiver and adjust current $I_{TX}$ accordingly. This may be accomplished by sending a control signal from the receiver to the transmitter. In some embodiments, the transmitter may be monitoring the receiver and may sense this condition. Once current $I_{TX}$ is increased, $V_{rect}$ can be measured at step 1102. If $X_2$ is greater than $X_{2,min}$, at step 1110, $X_2$ can be decreased, for example, by tuning capacitor $C_2$. At step 1112, $V_{rect}$ is monitored and at step 1114, reactance $X_3$ of capacitor $C_3$ is increased. For example, if tuning of $C_3$ is discrete (i.e. via a bank of capacitors) and increasing $X_3$ causes $V_{rect}$ to be out of the hysteresis band ε, steps 1110 to 1114 may be cycled through to stabilize $V_{rect}$. Control passes back to step 1102.

At step 1104, if $V_{rect}$ equals $V_{target}$ within ±ε and reactance $X_2$ does not equal maximum reactance $X_{2,max}$, then control passes back to step 1102.

At step 1104, if $V_{rect}$ is greater than $V_{target}$+ε, then $X_2$ is compared to maximum reactance $X_{2,max}$ at step 1116. If $X_2$ is less than $X_{2,max}$, at step 1118, $X_2$ is increased. Control passes back to step 1116. If $X_2$ is greater or equal to $X_{2,max}$, at step 1120, reactance $X_3$ is compared to $X_{3,min}$. If $X_3$ is greater than $X_{3,min}$, at step 1122, $X_3$ is decreased and control passes back to $V_{rect}$. If $X_3$ is less than or equal to $X_{3,min}$, at step 1124, transmitter current $I_x$ can be decreased. In some embodiments, the receiver can signal the transmitter to increase $I_x$. In some embodiments, the transmitter can detect the measurements at the receiver and adjust current $I_{TX}$ accordingly.

Tuning Loop #4: Regulate Rectified Voltage $V_{rect}$

In some embodiments of a wireless power receiver, the rectified voltage may be regulated by adjusting the capacitance value of the one or more capacitors in position $C_2$ (see at least FIG. 8C, 8E, or 8G). The adjustment value may depend on the maximum dissipation power allowed in the receiver resonator, of which capacitor $C_2$ is a part.

Figure 12B:
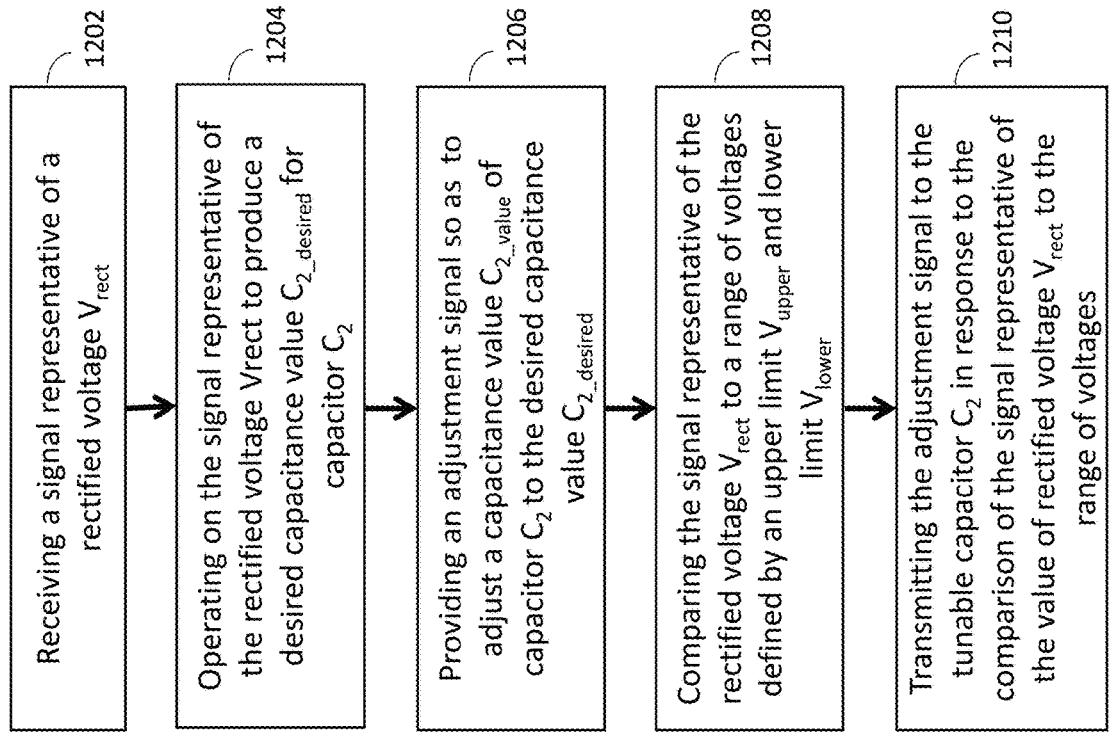
FIGS. 12A-12B are flowcharts of exemplary methods for adjusting a capacitance values of capacitor $C_2$ in a wireless power receiver having a controller.
Figure 12A:
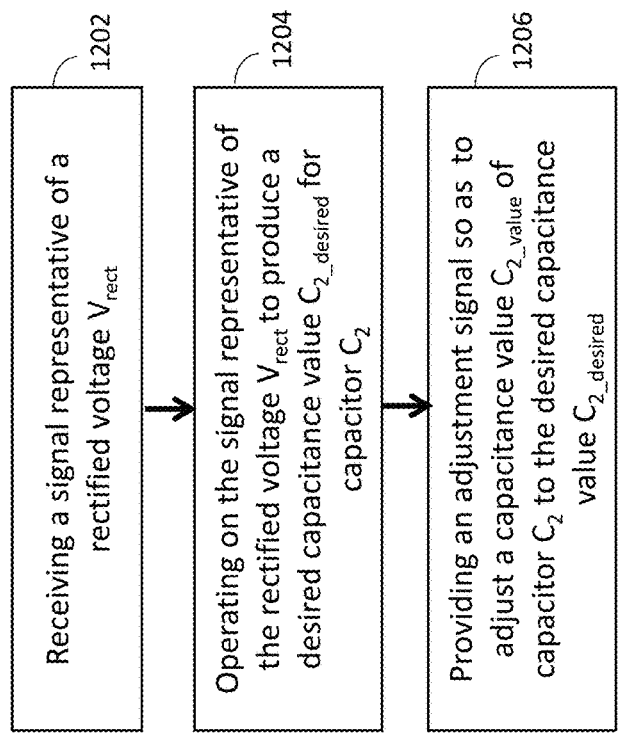

FIG. 12A is a flowchart of an exemplary method for a wireless power receiver having a controller. Note that each of the following steps can be executed by the controller coupled to components of the receiver. Examples of such controllers are shown in at least FIGS. 1-4, 7, and 9. Step 1202 receives, at a first input of the controller, a value signal representative of a rectified voltage $V_{rect}$. Step 1204 operates, in a processor coupled to the first input, on the signal representative of the rectified voltage $V_{rect}$ to produce a desired capacitance value $C_{2\_desired}$ for capacitor $C_2$. Step 1206 provides, via a first output of the controller, an adjustment signal so as to adjust a capacitance value $C_{2\_value}$ of capacitor $C_2$ to the desired capacitance value $C_{2\_desired}$.

FIG. 12B is a flowchart of an exemplary method for a wireless power receiver having a controller that includes steps 1202-1206. The exemplary method also includes step 1208 which compares, by the processor, the signal representative of the rectified voltage $V_{rect}$ to a range of voltages defined by an upper limit $V_{upper}$ and lower limit $V_{lower}$, the range of voltages stored in a memory of the controller. Step 1210 transmits, via the first output of the controller, the adjustment signal to the tunable capacitor $C_2$ in response to the comparison of the signal representative of the value of rectified voltage $V_{rect}$ to the range of voltages.

Figure 12C:
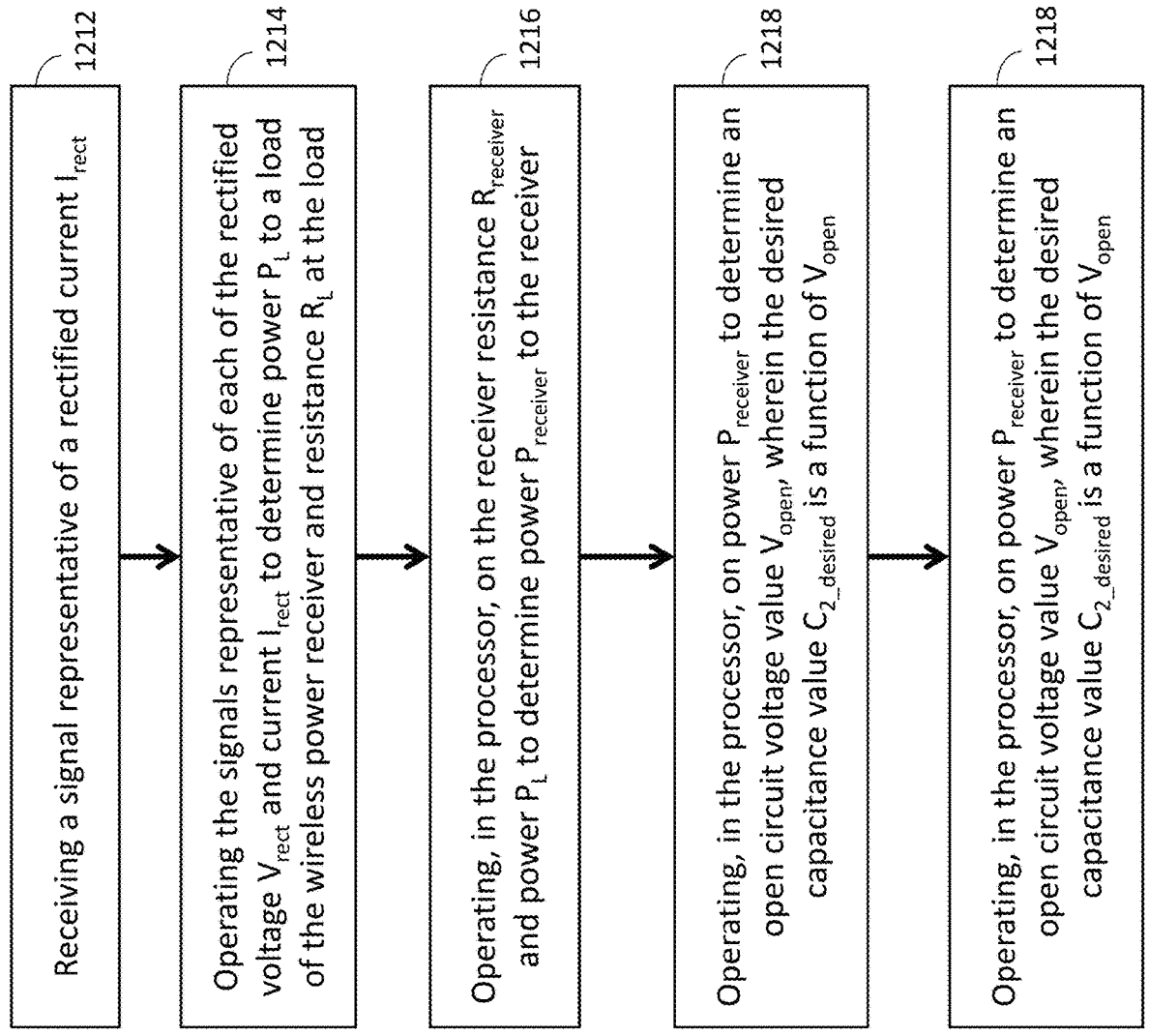
FIG. 12C is a flowchart of an exemplary method for producing the desired capacitance value $C_{2\_desired}$ of FIGS. 12A-12B.

FIG. 12C is a flowchart of an exemplary method for producing the desired capacitance value $C_{2\_desired}$ of step 1204 in FIGS. 12A-12B. Step 1212 receives at a second input of the controller, a signal representative of a rectified current $I_{rect}$. $I_{rect}$ can be sensed, measured, or calculated at the output of the rectifier of the receiver. Step 1214 operates, in the processor, on the signals representative of each of the rectified voltage $V_{rect}$ and current $I_{rect}$ to determine power $P_L$ to a load coupled to the rectifier output and resistance $R_L$ at the load. For example, the power $P_L$ and resistance $R_L$ can be calculated from these measurements:

$$R_L = V_{rect}/I_{rect}$$

$$P_L = I_{rect} \cdot V_{rect}$$

Step 1216 operates, in the processor, on the receiver resistance $R_{receiver}$ and power $P_L$ to determine power $P_{receiver}$ to the receiver. Receiver resistance $R_{receiver}$ and power to the receiver $P_{receiver}$ can be determined by:

$$R_{receiver} = \omega \cdot L_1/Q$$

$$U_d = \frac{R_l C_3^2}{((C_2 + C_3)^2 + \omega^2 R_l^2 C_2^2 C_3^2) R_d}$$

$$P_{receiver} = P_L(U_d + 1),$$

where $U_d$ is a figure-of-merit for the receiver.

Step 1218 operates, in the processor, on power $P_{receiver}$, a value of capacitor $C_2$, and a value of capacitor $C_3$ to determine an open circuit voltage value $V_{open}$, wherein the desired capacitance value $C_{2\_desired}$ is a function of $V_{open}$. The values of capacitors $C_2$ and $C_3$ can be a most recent measurement or estimation.

To calculate $V_{open}$, the Thevenin impedance $Z_{th}$ of receiver circuit is determined:

$$Z_{th} = Z_3 + \frac{(Z_1)(Z_2)}{Z_1 + Z_2}$$

-continued where $$Z_1 = R_1 + j\omega L_1$$

$$Z_2 = R_2 + \frac{1}{j\omega C_2}$$

$$Z_3 = R_3 + \frac{1}{j\omega C_3}.$$

From the Thevenin impedance, the AC-side voltage is determined:

$$V_{AC} = \frac{V_L Z_{th}}{R_L}.$$

Thus, the open circuit voltage value $V_{open}$ can be determined by:

$$V_{open} = V_{th} = \frac{V_{ac}}{j\omega C_2 R_d - \omega^2 L_d C_2 + 1}$$

Thus, to produce the desired capacitance value $C_{2\_desired}$ of step 1204 in FIGS. 12A-12B:

$$C_{2\_desired} = \frac{2\omega^2 L_d \mp \sqrt{4\omega^4 L_d^2 - 4(\omega^4 L_d^2 + \omega^2 R_d^2)\left(1 - \left(\frac{V_{ac}}{V_{open}}\right)^2\right)}}{2(\omega^4 L_d^2 + \omega^2 R_d^2)}.$$

Note that, in some embodiments, the maximum capacitance value of $C_2$ can be determined by the following:

$$C_{2\_max} = \frac{2\omega^2 L_d \mp \sqrt{4\omega^4 L_d^2 - 4(\omega^4 L_d^2 + \omega^2 R_d^2)\left(1 - \left(\frac{V_{ac}}{V_{ocmax}}\right)^2\right)}}{2(\omega^4 L_d^2 + \omega^2 R_d^2)}.$$

where $V_{ocmax}$ is the maximum open circuit voltage value that is dependent on the circuit. It can be helpful to determine the maximum capacitance value $C_{2\_max}$ such that the value of capacitor $C_2$ has an upper limit. This may mitigate any potential harm or damage from high voltages in the receiver. In some embodiments, the value of $C_{2\_desired}$ can equal the value $C_{2\_max}$.

Figure 13:
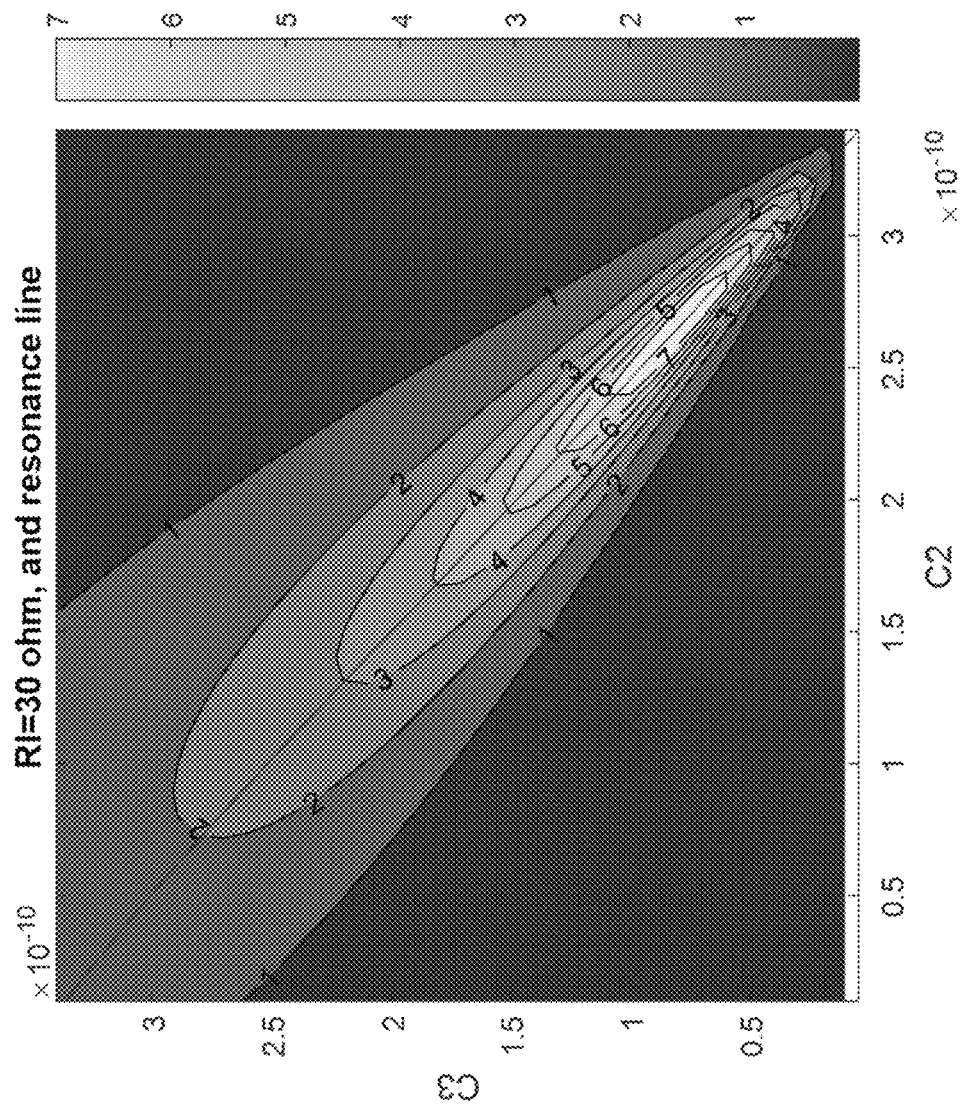
FIG. 13 is a plot of voltage at load resistance $R_{load}$ of 30Ω as a function of capacitance values of $C_2$ and $C_3$.

In some embodiments, once having determined the desired value for capacitor $C_2$, a desirable value for capacitor $C_3$ can be determined with the goal of obtaining a rectified voltage $V_{rect}$ within a range of $V_{upper}$ and $V_{lower}$. In an exemplary embodiment, the capacitance value of $C_3$ can be determined by a lookup table that stores the values of $C_2$, $C_3$ pairs. FIG. 13 is a plot of AC load voltage $V_{AC\_load}$ at load resistance $R_{load}$ of 30Ω as a function of capacitance values of $C_2$ and $C_3$. Note that the relationship between AC load voltage $V_{AC\_loaded}$ is as follows:

$$V_{AC\_loaded} = \frac{2\sqrt{2}}{\pi} V_{rect}.$$

A lookup table derived from this function, and stored in the memory of a controller, can be accessed by a processor to provide adjustment values for tunable capacitor $C_3$. Note that, in this embodiment, the approximate relationship between $C_2$ and $C_3$ is that, for a higher desired voltage, the adjustment signal for capacitor $C_2$ from the processor would be configured to increase the capacitance value of $C_2$ (within a limit 1304). The adjustment signal for capacitor $C_3$ would be configured to decrease the capacitance value of $C_3$ (within a limit 1304).

In some embodiments, the known values of capacitors $C_2$ and $C_3$ can be further refined or observed by using the induced voltage, open circuit conditions, known power to the receiver, and loading condition at the receiver load. Knowing the open circuit voltage of the output of the rectifier can lead to the value of capacitor $C_2$ by the following relationships:

$$|V_{Open\_Circuit}| = |A_{Open\_Circuit}| * |V_{Induced}|$$

where:

$$|V_{Induced}| = I_{Tx\_Coil} \omega M$$

$$|A_{Open\_Circuit}| = \frac{|X_2|}{\sqrt{R_{L1}^2 + X_{L1}^2 + X_2^2 + 2X_{L1}X_2}}$$

where resistance of inductor $L_1$ is $R_{L1} = X_{L1}/Q_{L1}$, reactance of capacitor $C_2$ is $|X_2| = 1/(\omega C_2)$ and reactance of inductor $L_1$ is $X_{L1} = \omega L_1$. Note that the open circuit voltage is only dependent on $C_2$ (not $C_3$), the equations above can be rearranged to accurately determine $C_2$. In an alternative embodiment, when assuming that the $Q_{L1}$ is relatively high (i.e. low $R_{L1}$), the following approximations can be made:

$$X_2 \cong \frac{X_{L1}}{|A_{Open\_Circuit}| - 1} \text{ or } C_2 \cong \frac{|A_{Open\_Circuit}| - 1}{\omega |A_{Open\_Circuit}| X_{L1}}.$$

Once the open-circuit characteristics (and hence reactance characteristics of $X_2$), the loading conditions and power delivery can be used to calculate the magnitude of the Thevenin impedance and hence the remaining reactance variable of $X_3$. The equations relating $Z_{TH}$ are shown above. Additionally when solving for the Thevenin equivalents with respect to power, the following relationship can be used:

$$|V_{ac}|^2 = \frac{|V_{TH}|^2}{2} - P_{LOAD} R_{TH} \pm \sqrt{\left(\frac{|V_{TH}|^2}{2} - P_{LOAD} R_{TH}\right)^2 - P_{LOAD}^2 |Z_{TH}|^2}$$

where the addition is used when $R_{LOAD} > |Z_{TH}|$ (typical), the subtraction is used when $R_{LOAD} < |Z_{TH}|$, and the Thevenin voltage is given by:

$$V_{TH} = V_{Induced} \frac{-j|X_2|}{R_{L1} + j(|X_{L1}| - |X_2|)}.$$

In some embodiments, the adjustment signal may be input to the tunable capacitors themselves or a means for adjusting the value of a tunable capacitor. For example, the adjustment signal may be input to a PWM generator, which would adjust the value of any of the tunable capacitors described herein, such as tunable capacitor $C_1$, $C_2$, or $C_3$ (see FIGS.

8A, 8C, 8E, and 8G). In another example, the adjustment signal may be input to a switch controller to switch to the appropriate value of a bank of capacitors. In yet another example, the capacitors may be tuned via adjustment signals for mechanical or piezoelectric means. In a further example, the adjustment signal for a BST capacitor can be provided as a DC voltage since the capacitance value of BST capacitor is a monotonic function of DC voltage bias.

Tuning Loop #5: Tune Matching According to a Function

Figure 14A:
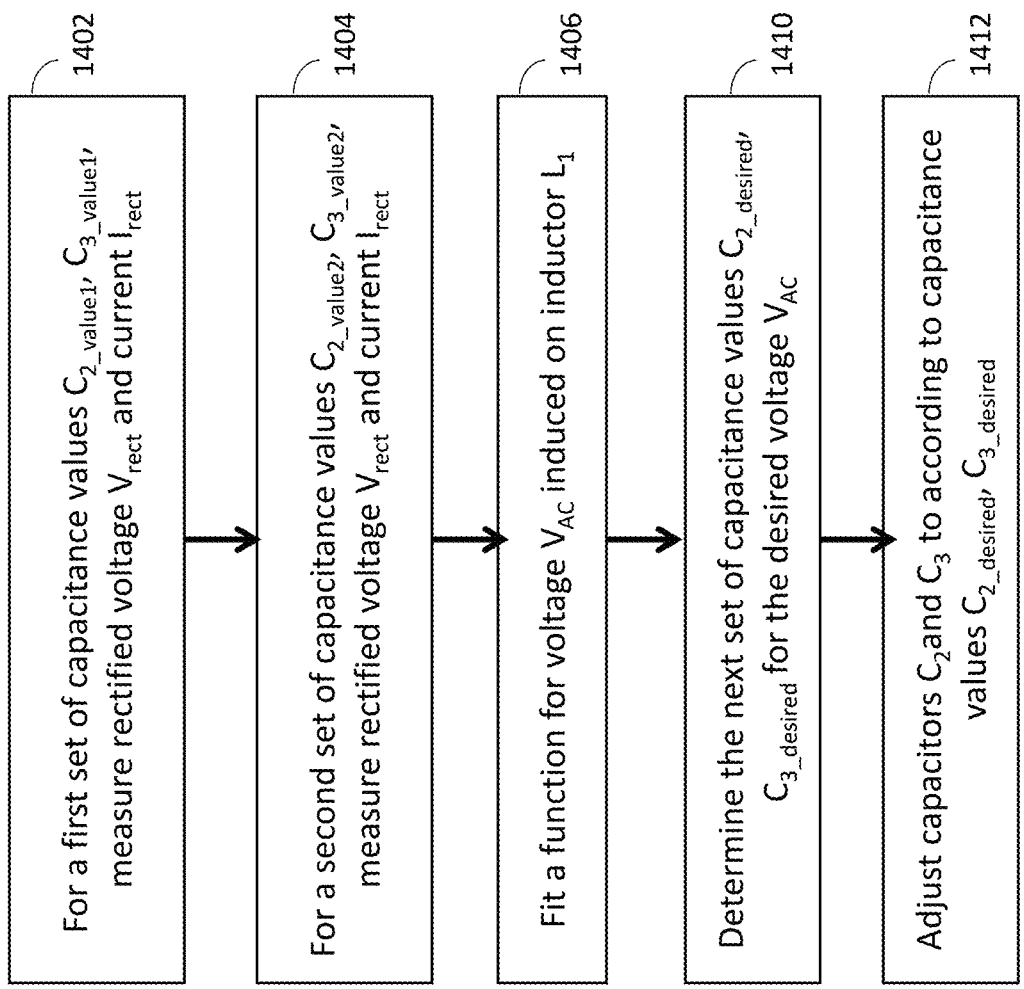
FIG. 14A is a flowchart of an exemplary method for tuning based on a function.
Figure 14B:
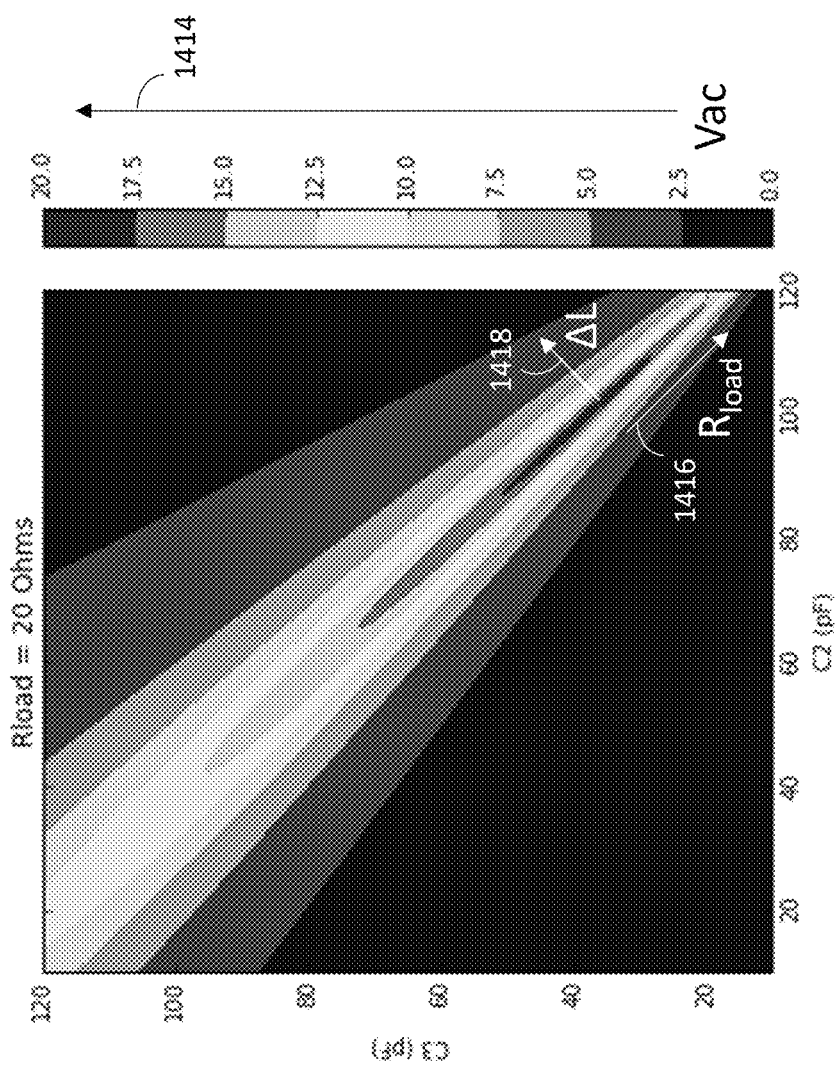
FIG. 14B is an exemplary function of voltage $V_{AC}$ as a function of capacitance $C_2$ and $C_3$ of a load resistance $R_{load}$ of 20 Ω.

In an exemplary embodiment, the tuning of the receiver matching can be adjusted based on a function determined by a processor of the controller, receiver, or both. FIG. 14A is a flowchart of an exemplary method for tuning based on a function. In step 1402, for a first set of capacitance values $C_{2\_value1}$, $C_{3\_value1}$ of capacitor positions $C_2$ and $C_3$, respectively, rectified voltage $V_{rect}$ and current $I_{rect}$ can be measured and input to the processor. In step 1404, these measurements can be repeated for a second set of capacitance values $C_{2\_value2}$, $C_{3\_value2}$ and input to the processor. In step 1406, having measurements for at least two or more sets of capacitance values, the processor may then fit a function for voltage $V_{AC}$ induced on inductor $L_1$, load resistance $R_{load}$, and/or change in inductance $\Delta L$. In some embodiments, instead of using a "fit" to determine the function, an estimation of the function parameters ($\Delta L$, $V_{AC}$, and $R_{load}$) can be sufficient to determine the desired values $C_{2\_desired}$, $C_{3\_desired}$. In some embodiments, a Gaussian Process can be used to quickly converge on the values of $\Delta L$, $V_{AC}$, and $R_{load}$. In step 1410, the processor can determine the next set of capacitance values $C_{2\_desired}$, $C_{3\_desired}$ for the desired voltage $V_{AC}$. In some embodiments, the next set of capacitance values $C_{2\_desired}$, $C_{3\_value\_desired}$ can be for the target or desired voltage $V_{AC}$. In an optional step, from the function, the processor can calculate the ideal matching values for $C_2$ and $C_3$. In other embodiments, the next set of capacitance values $C_{2\_desired}$, $C_{3\_desired}$ can be at some point between the sampled points ($C_{2\_value\_1}$, $C_{3\_value\_1}$, $C_{2\_value\_2}$, $C_{3\_value\_2}$) and the ideal matching values of $C_2$ and $C_3$. In step 1412, the tunable capacitors in positions $C_2$ and $C_3$ can be adjusted according to $C_{2\_desired}$, $C_{3\_desired}$ via an adjustment signal from the controller. Note that the fit of the function can be repeated for each new set of measurements. FIG. 14B is an exemplary function of voltage $V_{AC}$ as a function of capacitance $C_2$ and $C_3$ of a load resistance $R_{load}$ of 20Ω. Arrow 1414 shows the increasing direction of the scale for voltage $V_{AC}$, arrow 1416 shows how the function can change for a change in load resistance $R_{load}$, and arrow 1418 shows the function can change for a change in inductance $\Delta L$.

While the disclosed techniques have been described in connection with certain preferred embodiments, other embodiments will be understood by one of ordinary skill in the art and are intended to fall within the scope of this disclosure. For example, designs, methods, configurations of components, etc. related to transmitting wireless power have been described above along with various specific applications and examples thereof. Those skilled in the art will appreciate where the designs, components, configurations or components described herein can be used in combination, or interchangeably, and that the above description does not limit such interchangeability or combination of components to only that which is described herein.

All documents referenced herein are hereby incorporated by reference.

What is claimed is:

1. A wireless power receiver comprising:
    a circuit comprising a first tunable capacitor in parallel with an inductor, the wireless power receiver adapted to receive an induced voltage input ($V_{induced}$) at the inductor due to a magnetic field generated by a wireless power transmitter, the wireless power receiver having an effective receiver resistance ($R_{receiver}$);
    a second tunable capacitor coupled in series with the circuit;
    a rectifier coupled to the circuit, the rectifier having an output with a rectified voltage ($V_{rect}$) and a rectified current ($I_{rect}$); and
    a controller having a first input for receiving a first signal representative of the rectified voltage ($V_{rect}$) and a first output for supplying a first adjustment signal to the first tunable capacitor, the controller including a processor coupled to the first input and configured to:
        operate on the first signal representative of the rectified voltage ($V_{rect}$) to produce a desired capacitance value ($C_{2\_desired}$) of the first tunable capacitor; and
        provide the adjustment signal to adjust a first capacitance value ($C_{2\_value}$) of the first capacitor to the desired capacitance value ($C_{2\_desired}$);
    wherein, to produce the desired capacitance value ($C_{2\_desired}$), the controller is configured to:
        receive, at a second input of the controller, a second signal representative of the rectified current ($I_{rect}$);
        operate, in the processor, on the first signal and the second signal to determine a first power ($P_L$) to a load coupled to the output of the rectifier and a resistance ($R_L$) at the load;
        operate, in the processor, on the effective receiver resistance ($R_{receiver}$) and the first power ($P_L$) to determine a second power ($P_{receiver}$) to the receiver; and
        operate, in the processor, on the second power ($P_{receiver}$), the first capacitance value, and a second capacitance value of the second capacitor to determine an open circuit voltage value ($V_{open}$), wherein the desired capacitance value ($C_{2\_desired}$) is a function of the open circuit voltage value ($V_{open}$).

2. The receiver of claim 1 wherein the processor is configured to compare the first signal representative of the rectified voltage ($V_{rect}$) to a range of voltages defined by an upper limit ($V_{upper}$) and a lower limit ($V_{lower}$), the range of voltages stored in a memory of the controller; and wherein the controller is configured to transmit the first adjustment signal to the first tunable capacitor in response to the comparison of the first signal representative of the rectified voltage ($V_{rect}$) to the range of voltages.

3. The receiver of claim 1, wherein the controller includes a second output for supplying a second adjustment signal to the second tunable capacitor, wherein the controller, transmits, via the second output, the second adjustment signal to the second tunable capacitor to adjust a second capacitance value ($C_{3\_value}$) of the second capacitor in response to a comparison of the first signal representative of the rectified voltage ($V_{rect}$) to a range of voltages defined by an upper limit ($V_{upper}$) and a lower limit ($V_{lower}$), the range of voltages stored in a memory of the controller.

4. The receiver of claim 3 wherein the controller selects the second capacitance value from the memory of the controller storing a lookup table that includes a selected second capacitance value for a given first capacitance value and a load voltage value ($V_{L\_value}$) for at least one load resistance value ($R_{L\_value}$).

5. The receiver of claim 3 wherein the controller selects the second capacitance value ($C_{3\_value}$) of the second tunable capacitor such that the first capacitance value and the second capacitance value are resonant with an inductance value ($L_{1\_value}$) of the inductor, with a resonant frequency ($f_{resonant}$).

6. The receiver of claim 5 wherein the resonant frequency ($f_{resonant}$) is approximately 6.78 MHz.

7. The receiver of claim 1 wherein the second capacitor comprises two or more capacitors coupled in parallel or in series.

8. The receiver of claim 1 wherein the second capacitor comprises a switched capacitor, pulse width modulation (PWM) controlled capacitor, varactor, or barium strontium titanate (BST) capacitor.

9. The receiver of claim 1 further comprising a means for adjusting the second capacitance value ($C_{3\_value}$).

10. The receiver of claim 1 further comprising a means for adjusting the second capacitance value ($C_{2\_value}$).

11. The receiver of claim 1 wherein the first capacitor comprises two or more capacitors coupled in parallel or in series.

12. The receiver of claim 1 further comprising a third tunable capacitor coupled in series with the inductor Rig wherein the controller includes a third output for supplying a third adjustment signal to the third tunable capacitor.

13. A method for regulating rectified voltage ($V_{rect}$) in a system including a controller coupled to a wireless power receiver, the wireless power receiver including a rectifier coupled to a circuit, the circuit comprising a first tunable capacitor in parallel with an inductor, the wireless power receiver having an effective receiver resistance ($R_{receiver}$), the rectifier having an output with the rectified voltage ($V_{rect}$) and a rectified current ($I_{rect}$), the method comprising:

receiving, at a first input of the controller, a first signal representative of the rectified voltage ($V_{rect}$), operating, in a processor coupled to the first input, on the first signal to produce a desired capacitance value ($C_{2\_desired}$) for the first capacitor; and providing, via a first output of the controller, a first adjustment signal to adjust a first capacitance value ($C_{2\_value}$) of the first capacitor to the desired capacitance value ($C_{2\_desired}$), wherein producing the desired capacitance value ($C_{2\_desired}$) further comprises:

receiving, at a second input of the controller, a second signal representative of a rectified current ($I_{rect}$);

operating, in the processor, on the first signal and the second signal to determine a first power ($P_L$) to a load coupled to the output of the rectifier and a resistance ($R_L$) at the load;

operating, in the processor, on the effective receiver resistance ($R_{receiver}$) and the first power ($P_L$) to determine a second power ($P_{receiver}$) to the receiver; and operating, in the processor, on the second power ($P_{receiver}$) to determine an open circuit voltage value ($V_{open}$), wherein the desired capacitance value ($C_{2\_desired}$) is a function of the open circuit voltage value ($V_{open}$).

14. The method of claim 13 further comprising:

comparing, by the processor, the first signal representative of the rectified voltage ($V_{rect}$) to a range of voltages defined by an upper limit ($V_{upper}$) and a lower limit ($V_{lower}$), the range of voltages stored in a memory of the controller; and transmitting, via the first output of the controller, the first adjustment signal to the first tunable capacitor in response to the comparison of the first signal representative of the rectified voltage $V_{rect}$ to the range of voltages.

15. The method of claim 13 further comprising transmitting, via a second output of the controller, a second adjustment signal to a second tunable capacitor coupled in series with the circuit.

16. The method of claim 15 further comprising selecting, from a lookup table stored in a memory of the controller, a second capacitance value ($C_{3\_value}$) for the second tunable capacitor based on a given first capacitance value, the lookup table including at least one load voltage value ($V_L$) for at least one load resistance ($R_L$).

17. The method of claim 15 further comprising adjusting, by the processor, the second capacitance value ($C_{3\_value}$) of the second tunable capacitor such that first capacitance value and the second capacitance value are resonant with an inductance value ($L_{1\_value}$) of the inductor, with a resonant frequency ($f_{resonant}$).

18. The method of claim 15 further comprising determining the second adjustment signal based on a comparison of the first signal representative of the rectified voltage ($V_{rect}$) to a range of voltages defined by an upper limit ($V_{upper}$) and a lower limit ($V_{lower}$), the range of voltages stored in a memory of the controller.

19. The method of claim 15 wherein the circuit includes a third tunable capacitor coupled in series with the inductor, wherein the controller includes a third output for supplying a third adjustment signal to the third tunable capacitor.

* * * * *